United States Patent [19]

Kawai et al.

[11] Patent Number: 5,305,393
[45] Date of Patent: Apr. 19, 1994

[54] LABELLING CIRCUIT AND PROCESSOR FOR IMAGE PROCESSING

[75] Inventors: Ryutaro Kawai; Toshimi Kobayashi, both of Chiba, Japan

[73] Assignee: Kawasaki Steel Corporation, Hyogo, Japan

[21] Appl. No.: 813,792

[22] Filed: Dec. 26, 1991

[30] Foreign Application Priority Data

Dec. 28, 1990 [JP] Japan .................................. 2-417487
Sep. 30, 1991 [JP] Japan .................................. 3-278216

[51] Int. Cl.$^5$ .............................................. G06K 9/00
[52] U.S. Cl. ........................................... 382/9; 382/8; 382/26; 382/47
[58] Field of Search ............................ 382/9, 47, 26, 8

[56] References Cited

U.S. PATENT DOCUMENTS

4,189,711 2/1980 Frank ................................... 382/26

OTHER PUBLICATIONS

Patent Abstracts of Japan, JP-A-20 29 880, vol. 14, No. 183, 12 Apr. 1990.
Patent Abstracts of Japan, JP-A-56 153 471, vol. 6, No. 34, 2 Mar. 1982.
Patent Abstracts of Japan, JP-A-31 02 480, vol. 15, no. 296, 26 Jul. 1991.
Patent Abstracts of Japan, JP-A-62 077 687, vol. 11, No. 279, 10 Sep. 1987.
Patent Abstracts of Japan, JP14 A-20 48 778, vol. 14, No. 2143, 7 May 1990.
Patent Abstracts of Japan, JP-A-62 009 478, vol. 11 No. 181, 11 Jun. 1987.

*Primary Examiner*—Leo H. Boudreau
*Attorney, Agent, or Firm*—Oliff & Berridge

[57] ABSTRACT

A temporarily labelled image data generating circuit is composed of an initial label memory, which stores the initial temporary label values of pixels that are connected within the line being scanned, and a run length counter, which counts the number of pixels of the connected pixels, and finally labelled image data is generated following the generation of temporarily labelled image data and temporary label table data, which indicate the conversion relation for the modification of the temporary labels, using the initial label memory and run length counter, which improves the processing speed by reducing the number of times the memory is accessed and reduces the storage capacity of the working memory.

14 Claims, 20 Drawing Sheets

FIG. 7

| NUMBER | STATUS OF MASK MEMORY | CONTENT OF PROCESSING |
|---|---|---|
| a1 | 0 0 0 / 0 1 | FIFO_WRITE (0)(RUN)<br>RUN ← 1<br>NL ← 1 |
| a2 | H2 0 0 / 0 1 | FIFO_WRITE (0)(RUN)<br>RUN ← 1<br>ZL ← H2 |
| a3 | * H1 0 / 0 1 | FIFO_WRITE (0)(RUN)<br>RUN ← 1<br>ZL ← H1 |
| a4 | 0 0 H0 / 0 1 | FIFO_WRITE (0)(RUN)<br>RUN ← 1<br>ZL ← H0 |
| a5 | * H1 H0 / 0 1 | |
| a6 | H2 0 H0 / 0 1 | FIFO_WRITE (0)(RUN)<br>RUN ← 1<br>if H2 ≠ H0 then<br>  if H2 < H0<br>    then ZT[H0] ← H2<br>        ZL ← H2<br>    else ZT[H2] ← H0<br>        ZL ← H0<br>else ZL ← H2 |

FIG. 8

| NUMBER | STATUS OF MASK MEMORY | CONTENT OF PROCESSING |
|---|---|---|
| b1 | ![x x 0 / 1 1] ![H2 H1 H0 / 1 1] ![0 H1 H0 / 1 1] | RUN ← RUN + 1 |
| b2 | ![0 0 H0 / 1 1] ![H2 0 H0 / 1 1] | RUN ← RUN + 1<br>if ZL ≠ H0 then<br>  if ZL > H0<br>    then ZT[ZL] ← H0,<br>        ZL ← H0<br>    else ZT[H0] ← ZL<br>NL = 0 |
| c1 | ![x x x / 1 0] | if NL = 1<br>then ZL ← ZLC, ZLC ← ZLC+1,<br>    NL ← 0<br>FIFO_WRITE(ZL)(RUN)<br>RUN ← 1<br>ZL ← 0 |

LABELLING CIRCUIT AND PROCESSOR FOR IMAGE PROCESSING

BACKGROUND OF THE INVENTION

1. Field of the Invention

The present invention relates to an image processing labelling circuit which, during the course of scanning two-valued pictures in one scene in raster scan direction with a specified mask, mainly recognizes the connectedness of an envisaged pixel and the pixels surrounding the envisaged pixel within the mask and sequentially determines and assigns a label value to each pixel. More particularly, the present invention relates to an image processing labelling circuit and labelling processor which provide the possibility of improving the processing speed and reducing the storage capacity of the working memory.

2. Description of the Prior Art

In recent years, the improvement in the processing capacity of digital processing devices such as micro processors (hereinafter called a MPU) and the like has led to automation in various fields, the automation making use of these digital processing devices.

For example, advanced image processing techniques, when applied to parts inspection in factories or hemocyte inspections and cytodiagnosis in the medical field, have led to automatic counting of the number of parts within a scene, the parts being part of the object of inspection, or to automatic counting of hemocytes and cells.

In order to count the objects in a specified picture, regions of, for example, black and white two-valued pictures contained in the picture must be recognized. To achieve this, the connectedness of each of the picture elements in the picture is evaluated, and for each region, which, for example, corresponds to the value black, labelling processing is performed.

The image processing labelling, which labels each region in a specified picture, provides the possibility of determining for each labelled region the area thereof, the length of the circumference thereof and the moment M and the angle $\theta$ principal axis thereof.

In general, the processing in an image processing labelling circuit, which labels each region in a specified picture in raster scan format, comprises the following three steps.

- A. Temporary labelling. (Generation of the temporarily labelled image data and the temporary label table data, the latter indicating the conversion relations for the modification of the temporary labels.)
- B. Arrangement of the label table.
- C. Final labelling. (Generation of the finally labelled image data.)

A variety of such image processing labelling techniques have been disclosed.

For example, Japanese Patent Laid-Open Application 77687/1987 discloses a technique in which image data, such as temporarily labelled image data, in an image processing labelling circuit is composed of the coordinate data of the starting point of connected pixels which are to be labelled with one and the same label, the coordinate data of the end point of connected pixels and identification data, which holds the label value of the connected pixels.

According to the technique disclosed by Japanese Patent Laid-Open Application 77687/1987, it is possible to reduce the memory capacity of the working memory in the image processing labelling circuit.

Furthermore, Japanese Patent Laid-Open Application 29880/1990 discloses a technique which relates to the improvement of the temporary labelling processing (the improvement of temporary labelling algorithm), with the temporary labelling processing being performed for each pixel in a window consisting of 5 pixels. According to Japanese Patent Laid-Open Application 29880/1990, a scene comprising a plurality of pictures, each of which exists independently within the scene, is scanned using a window consisting of $\{(1\times3)+(1\times2)\}=5$ pixels, and an image processing labelling circuit performs temporary labelling in accordance with a plurality of classified window patterns while accessing a connection relation table.

The technique disclosed by Japanese Patent Laid-Open Application 29880/1990 provides the possibility of reducing the number of memory read and write accesses for the connection relation table memory, with the memory read and write accesses being performed each time one pixel is input when each pixel is labelled during the labelling of each region in a specified picture in raster scan format.

Furthermore, Japanese Patent Laid-Open Application 48778/1990 discloses a labelling technique that uses an ordinary two-valued mask consisting of an envisaged pixel and pixels adjacent to the envisaged pixel. The labelling is performed while making validity checks, by comparing the two-valued mask status of the run label, which represents the labels assigned to the adjacent runs, and, if a plurality of adjacent runs exist, of the connected label, which is the newest label among the adjacent run labels, in the initial label selection control portion. That is, according to this technique, labelling is performed while making validity checks for which not only the pixels in the mask, which consists of the envisaged pixel and pixels adjacent to the envisaged pixel, but also labels of pixels outside the mask are used.

According to Japanese Patent Laid-Open Application 48778/1990, during the initial labelling in the image processing labelling circuit, it is possible to prevent an overflow of the initial labels during the processing, the overflow resulting from a significant increase in the number of initial labels (types), and to prevent the load of the integration processing part from increasing, the object of the integration processing part being the mutual consolidation of the initial labels.

Furthermore, Japanese Patent Laid-Open Application 9478/1987 discloses a technique which allows the reduction of the number of times the working memory is accessed by using a mask of $m\times n$ pixels and by using a MAX-MIN format label relation table in the labelling processor, which performs the labelling of each region in a specified picture in raster scan format.

In the MAX-MIN format label relation table, the table addresses are conversion source label values, the table data is conversion target label values, and only table data, the value of which is smaller than the value of the corresponding table address, is written into the memory of each table address.

Also, in Japanese Patent Laid-Open Application 9478/1987, a label separation detection portion is provided. This label separation detection portion sets a separation detection flag, if it is detected that in a junction, where two connected pixels of different label values meet, the MAX and MIN of the MAX-MIN format label relation table are not equal. If the separation detection flag is set, repetition of the table conversion of the label relation table prevents one and the same object from being separated due to partially different labelling.

However, although Japanese Patent Laid-Open Application 77687/1987 provides the possibility of reducing the storage capacity of the working memory in an image processing labelling circuit when compared with conventional image processing labelling circuits, it is a problem that three types of data, namely the coordinate data of the starting point of the connected pixel, the coordinate data of the end point of the connected pixel and an identifier, which holds the label value of the connected pixel, must be stored for each connected pixel to which one and the same label is assigned.

For example, if the number of pixels per scene is $30 \times 10 = 300$, at least 5 bits are required to express the coordinates of the starting point and end point (the maximum value of the coordinates is 30) of the connected pixel to which one and the same label is assigned. Accordingly, if the memory, which stores the label value of the connected pixel, is an 8-bit memory, a storage element of a total of 18 bits is required for each connected pixel to which one and the same label is assigned.

Also, it is presumed that, in Japanese Patent Laid-Open Application 29880/1990, the storage of the labelling for each pixel is performed for each pixel, which has the disadvantage of taking up an enormous amount of working memory. If, for example, one label value is stored in an 8-bit memory element, and, if the number of pixels per scene is $30 \times 10 = 300$, then a working memory of a total of 2400 bits is required to store the label values of each pixel in the scene.

Also, in Japanese Patent Laid-Open Application 48778/1990, labelling is performed while checking the validity of the labelling for the envisaged pixel by comparing, during the labelling of the envisaged pixel, the two-valued mask status of the run label, which represents the labels assigned to the adjacent runs adjacent to the envisaged pixel, and, if a plurality of adjacent runs exist, of the connected label, which is the newest label among the adjacent run labels. Therefore, the labelling circuit is extremely complex, which causes a delay in the processing speed. Also, the verification of the correctness of this labelling circuit is supposed to be extremely difficult.

Furthermore, it is presumed that in Japanese Patent Laid-Open Application 9478/1987 the storage of the label value of each pixel is performed for each pixel. Therefore, as with the technique disclosed by Japanese Patent Laid-Open Application 29880/1990, there is the problem that the storage capacity of the working memory in the image processing labelling circuit tends to become large.

Also, in each of Japanese Patent Laid-Open Application 29880/1990 and Japanese Patent Laid-Open Application 9478/1987, there is a problem that, as shown in FIG. 19, many temporary label values occur, when each pixel in the portion indicated by the slant lines in FIG. 18 is being labelled, although the portion is a region to which one and the same label should be assigned. This results from the fact that only the temporary label values in the window, which consists of five pixels, are used as a condition for the determination of the label value (temporary label value) of the envisaged pixel, which assigns the temporary label.

Also, during the temporary labelling of each region of the picture shown in FIG. 21, a total of three junctions indicated by the numerals J1-J3 occur. This gives rise to a temporary labelling which uses many temporary labels, as illustrated in FIG. 21. Furthermore, the data of the MAX-MIN format label relation table at this time is such that label value 6 should be converted to label value 5, label value 4 should be converted to label value 2, label value 3 should be converted to label value 2 and label value 2 should be converted to label value 1. Hitherto, in order to complete such a label table arrangement, that is, for example, in order to convert all the label values 4, 3 and 2 into the label value 1, thus completing the arrangement of the label table, at least two table conversions had to be performed, which required a long processing time.

SUMMARY OF THE INVENTION

The present invention has been carried out to overcome the above-described difficulties. It is an object of the present invention to improve the processing speed by reducing the number of times the memory is accessed and to reduce the storage capacity of the working memory in an image processing labelling circuit and a labelling processor, which mainly recognizes, during the course of scanning two-valued pictures in one scene in raster scan direction with a specified mask, the connectedness of an envisaged pixel and the pixels surrounding the envisaged pixel within the mask and sequentially determines and assigns a label value to each pixel.

The present invention achieves the above-mentioned object by providing in an image processing labelling circuit, which, during the course of scanning two-valued pictures in one scene in raster scan direction with a specified mask, mainly recognizes the connectedness of an envisaged pixel and the pixels surrounding the envisaged pixel within the mask and sequentially determines and assigns a label value to each pixel, an initial label memory, which stores the initial temporary label values of the pixels which are connected within the line being scanned, and a run length counter, which counts the number of pixels which are connected within the line being scanned, and, by generating finally labelled image data following the generation of temporarily labelled image data and temporary label table data, which indicates the conversion relation for the integration of the temporary labels, using the initial label memory and the run length counter.

Also, the present invention achieves the above-mentioned object by providing in an image processing labelling circuit which, during the course of scanning two-valued pictures in one scene in raster scan direction with a specified mask, mainly recognizes the connectedness of an envisaged pixel and pixels surrounding the envisaged pixel within the mask and which comprises at least two stages, the sequential determination of a label value and assignment of a temporary label to each pixel to obtain temporarily labelled image data prior to converting the temporary label of each image data into a final label in accordance with the data of a final label table, a temporarily labelled image data generating circuit, which generates temporarily labelled image data, which may undergo a conversion for the modification of label values so that the label values are modified in decreasing label value order only, and temporary label table data, which indicates the conversion relation for the integration of the temporary labels, and a temporary label table whose addresses are the temporary label values and whose data is the conversion target temporary label values, and in which the temporary label table data is stored, and a final label table whose addresses are the temporary label values and whose data is the final label values, and a temporary label table data reading means, which sequentially reads the data, which is the conversion target temporary label values of the temporary label table, in the increasing order of the addresses, and a final label table data writing means, which compares the data read with the value of the address read, evaluates whether a conversion of the temporary label value corresponding to the address read is required or not, determines a final label value, which is a new final label value, and writes the final label value into the final label table at an address being equal to the address read, if a conversion is not required, and, if a conversion is required, reads data from the final label table at an address being equal to the value of the data, which was read from the temporary label table, and writes the data into the final label table at an address being equal to the address at which the read-out of the temporary label table was made, and by generating and writing the data of the final label table in accordance with the definitely determined data of the temporary label table following the generation of the temporarily labelled image data for one scene.

The above-described object is also achieved by the final label table data writing means which writes, during the conversion into the final label table, the value of the final label counter, which generates final labels of consecutive final label values, into the final label table at an address being equal to the address at which the temporary label table was read, if a conversion is not required.

In addition, the above-described object is also achieved by the temporarily labelled image data generating circuit, which comprises an initial label memory which stores the initial temporary label values of the pixels which are connected within the line being scanned, and a run length counter which counts the number of pixels which are connected within the line being scanned, and which, using the initial label memory and the run length counter, generates the final label table data following the generation of the temporarily labelled image data and temporary label table data, which indicates the conversion relation for the modification of the temporary labels.

The above-described object is also achieved by composing the temporarily labelled image data of the temporary label data and the run length data, which is the data of the number of pixels in the connected pixels, the data corresponding to the temporary label data.

In the present invention, an initial label memory, which stores the initial temporary label values of the pixels that are connected within the scan line which is scanned in raster scan direction with the specified mask, is first of all used to generate the temporarily labelled image data and the temporary label table data, the latter indicating the conversion relation for the modification of the temporary labels.

Also, a run length counter, which counts the number of pixels in the pixels that are connected in the scan line, is provided.

That is, in the circuit which generates the temporarily labelled image data and the temporary label table data, the latter indicating the conversion relation for the modification of the temporary labels (the circuit is hereinafter called a temporarily labelled image data generating circuit), a mask of, for example, $\{(1 \times 3) + (1 \times 2)\} = 5$ pixel is used to determine the initial label value of the envisaged pixel, and, if the sequentially scanned envisaged pixels are connected pixels, a run length counter counts the number of the pixels in the connected pixels.

Accordingly, even if in a junction as described above the label values of the connected pixels must be modified, the label values of the plurality of pixels can be updated at one time merely by rewriting the data of the initial label memory.

Also, as this update is carried out for the initial temporary labels not yet definitely determined, it prevents that the number of types of temporary labels unnecessarily increases.

In addition, the present invention's temporarily labelled image data for the connected pixels is only data which holds the temporary label value and the run length, so that the amount of data can be made smaller when compared with the amount of data of prior arts.

For example, if the number of pixels in one scene is $30 \times 10 = 300$ (the maximum run length value is 30), that is, if the run length data is 5 bits in length and the label value data is 8 bits in length, then only 13 bits are enough to hold the data of each horizontally connected pixel, to which one and the same label is assigned, which provides the possibility of reducing the necessary memory (from 18 bits to 13 bits) when compared with the conventional technique disclosed by Japanese Patent Laid-Open Application 77687/1987.

The present invention also provides the possibility of improving the processing speed of the label table arrangement of the temporary label table, in which the conversion relation for the modification of the temporary labels is stored, the conversion relation being such that data may undergo a conversion for the modification of label values so that the label values are modified in decreasing label value order only.

The inventor perceived that during the label table arrangement it is possible to create the temporary label table data, which is stored in the temporary label table, the addresses of which are the temporary label values and the data of which is conversion target temporary label values, so that the temporary label table data is data which may undergo a conversion for the modification of label values so that the label values are modified in decreasing label value order only. That is, the inventor perceived that conventional techniques as well as the technique of the present invention provide the possibility of creating the temporary label table in MAX-MIN format.

Also, the label table arrangement of such a temporary label table in MAX-MIN format first of all uses the temporary label table data reading means, which sequentially reads the data in the increasing order of the addresses, the data being the conversion target temporary label values of the temporary label table (the means is hereinafter simply called a temporary label table data reading means).

Also, the present invention uses a final label table data writing means, which compares the data read with the address value read, evaluates whether a conversion of the temporary label value corresponding to the address read is required or not, and, if a conversion is not required, determines a final label value, which is a new final label, and writes the final label table at an address being equal to the address read, and, if a conversion is required, reads data from the final label table at an address being equal to the value of the data, which was read from the temporary label table, and writes the data into the final label table at an address being equal to the address at which the read-out of the temporary label table was made (the means is hereinafter simply called a final label table data writing means).

That is, the inventor perceived that, if, during the label table arrangement of the temporary label table, which stores the temporary label table data which may undergo a conversion for the modification of label values so that the label values are modified in decreasing label value order only, the label table arrangement is carried out sequentially in the increasing order of the addresses, then the conversion relation for the temporary conversion target label values is already definitely determined, even if a conversion is required because the data read from the temporary label table and the address at which the data was read are different.

Accordingly, the inventor found out that the modification of each data of the temporary label table can be performed with only a total of at most two reads of the temporary label table or final label table and a total of one write into the final label table, when the label table arrangement of the temporary label table is carried out.

The above-described final label table data writing means of the present invention is not restricted to the concrete composition which evaluates whether a conversion of the temporary label value corresponding to the address at which the temporary label table was read is required or not, and, if a conversion is not required, determines the final label value, which is a new final label, and writes the final label value into the final label table at an address being equal to the address at which the temporary label table was read.

For example, if a conversion is not required, the data read from the temporary label table may be written as a final label value, which is a new final label, into the final label table (the address of the final label table is equal to the temporary label table's address at which the data was read).

Also, for example, if conversion is not required, the value of the final label counter, which generates final labels of consecutive label values, may be written, during conversion into the final label table, into the final label table at an address being equal to the address at which the temporary label table was read.

The final label counter is incremented (addition of "1") each time a new final label is issued.

Accordingly, if such a final label counter is used, the final label values written into the final label table are consecutive values, i.e. no value is skipped, so that the maximum value of the issued final label values can be kept small. It is thus possible to reduce the bit length of the storage means for the final label values of the final label table, which provides the possibility of cutting down the costs of the hardware.

In addition, the inventor also perceived that the processing of the temporary label table data reading means and the processing of the final label table data writing means may partly be performed simultaneously (pipeline processing). This not only improves the processing speed of the label table arrangement, but also has the effect of providing a fixed processing time required to perform the entire label table arrangement, because, if a conversion is required, for example, the read of data from the final label table and the read of data from the temporary label table for the next label table arrangement can be processed simultaneously.

Also, the temporary labelling circuit and the final labelling circuit are independent circuits in the labelling circuit, so that parallel processing is possible. Therefore, real time processing of the labelling (video rate) is possible.

The present invention does not restrict the temporarily labelled image data, which is output of the temporarily labelled image data generating circuit, to a composition of the temporary label data and the run length data, the latter being the data of the number of pixels in the connected pixels, the data corresponding to the temporary label data. However, such a composition of the temporarily labelled image data of temporary label data and run length data provides the possibility of reducing the storage capacity of the working memory which stores the temporarily labelled image data.

Also, the temporarily labelled image data generating circuit, which comprises the initial label memory and the run length counter of the image processing labelling circuit of the present invention, and the final label table generating circuit, which performs the label table arrangement of the temporary label table of the image processing labelling circuit of the present invention, can function independently. For example, it is possible to perform the label table arrangement and then to generate definitely finally labelled image data, using the technique disclosed by Japanese Patent Laid-Open Application 9478/1987, from the temporarily labelled image data, which is output from the temporarily labelled image data generating circuit of the present invention, and the temporary label table data, which indicate the conversion relation for the modification of the temporary labels. In this case, the temporarily labelled image data generating circuit must be provided with a label separation detection portion, and the separation detection flag must be set as required.

On the other hand, the final label table generating circuit, to which the present invention is applied and which performs the label table arrangement, can also be used for the label table arrangement of the label relation table in MIN-MAX format, which indicates the relation of the labels of one and the same object and which is generated in accordance with the technique disclosed by Japanese Patent Laid-Open Application 9478/1987, thus improving the processing speed.

On the other hand, if the image processing labelling circuit uses both the temporarily labelled image data generating circuit of the present invention and the label table generating circuit of the present invention, then it is possible to obtain outstanding results from the temporarily labelled image data generating circuit and the final label table generating circuit.

As described above, in an image processing labelling circuit, which sequentially determines and assigns a label value to each pixel in the course of scanning two-valued pictures contained in one scene in raster scan direction with a specified mask, it is possible, according to the present invention, to provide outstanding results such as the improvement of the processing speed by reducing the number of times the memory is accessed and the reduction of the storage capacity of the working memory.

BRIEF DESCRIPTION OF THE DRAWINGS

The preferred embodiments will be described in detail with reference to the accompanying drawings, wherein like elements have been denoted throughout the figures with like reference numerals, and wherein:

FIG. 7 is a first chart showing the relationship between the status of the mask memory and the content of the processing for the first embodiment according to the present invention;

FIG. 8 is a second chart showing the relationship between the status of the mask memory and the content of the processing for the first embodiment according to the present invention;

DESCRIPTION OF THE PREFERRED EMBODIMENTS

Figure 1:
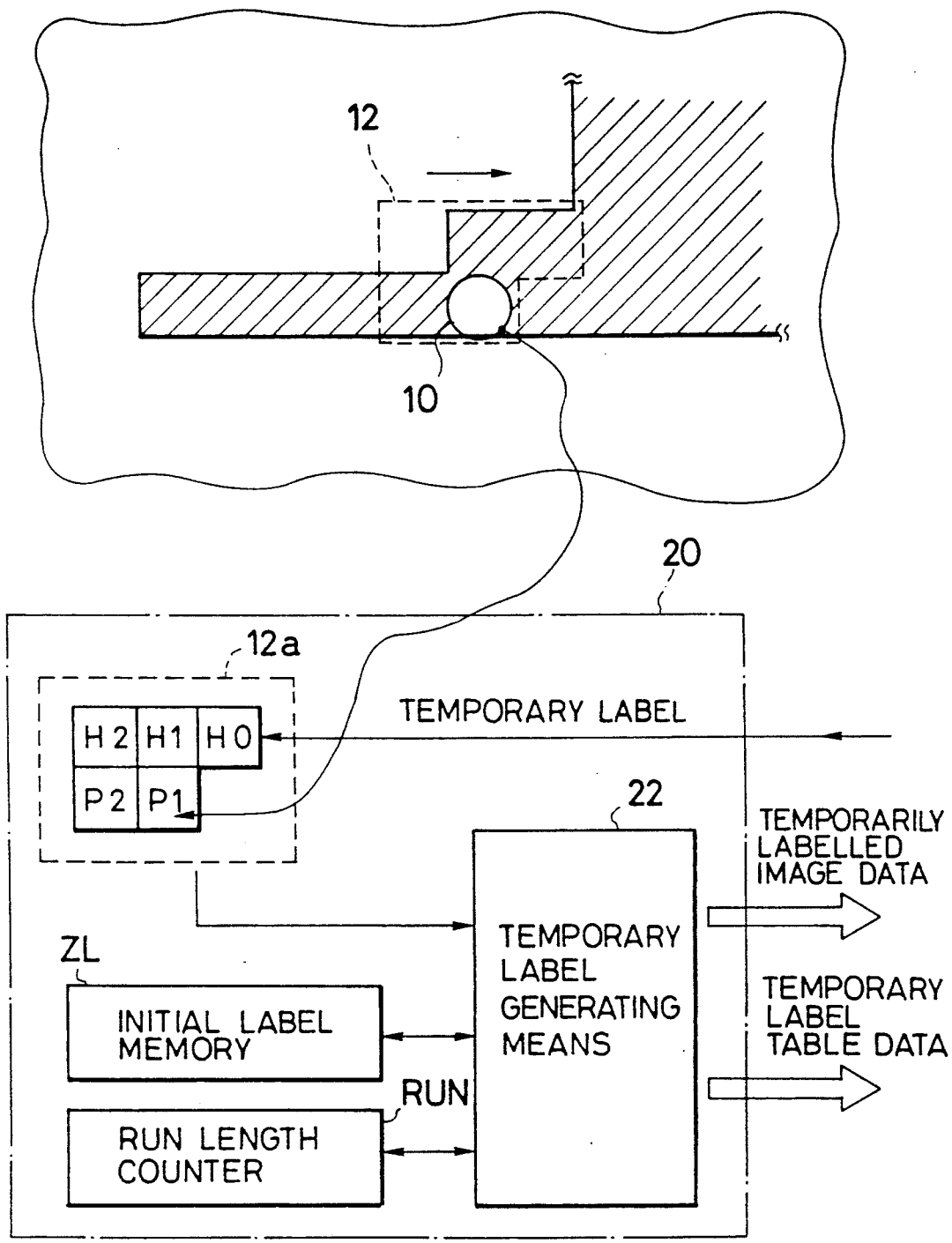
FIG. 1 is a block diagram which includes a model drawing of a portion of the first embodiment according to the present invention.

Hereinafter, embodiments of the present invention will be described referring to the drawings.

FIG. 1 is a block diagram which includes a model drawing of a portion of the first embodiment according to the present invention.

In FIG. 1, a temporarily labelled image data generating circuit 20 outputs the temporarily labelled image data of an envisaged pixel 10 as well as the temporary label table data which relates to the conversion relation of the temporary labels.

A mask memory 12a of the temporarily labelled image data generating circuit 20 stores the image data of the envisaged pixel 10 and the pixels surrounding the envisaged pixel 10. That is, the mask memory 12a is composed of a two-valued memory P1 for the envisaged pixel, a two-valued memory P2 for the pixel on the left side of the envisaged pixel, a label value memory H0 for the pixel on the upper right side of the envisaged pixel, a label value memory H1 for the pixel on top of the envisaged pixel and a label value memory H2 for the pixel on the upper left side of the envisaged pixel, with the two-valued memory P1 storing the two-valued picture of the envisaged pixel, the two-valued memory P2 storing the two-valued picture of the pixel located left adjacent to the envisaged pixel 10, and the label value memories H0, H1 and H2 storing the label values of the pixels on the upper right side, on top of and on the upper left side of the envisaged pixel, respectively.

The data "0" or "1" is stored in the two-valued memories P1 and P2. 10-bit data, i.e. data from "0" to (2 raised to the 10th power $-1$), is stored in the label value memories H0–H2.

Each memory of the mask memory 12a corresponds to the envisaged pixel 10 and the mask 12. In the course of the scanning of the envisaged pixel 10 and the mask 12, data is read into each memory and data of each memory is shifted.

That is, when a pixel corresponding to one pixel of the mask 12 is scanned, the data of the two-valued memory P1 is shifted to the two-valued memory P2, and the data corresponding to the envisaged pixel 10 is written into the two-valued memory P1. Namely, if the envisaged pixel 10 is white, "0" is written into the two-valued memory P1, and if the envisaged pixel 10 is black, "1" is written into the two-valued memory P1.

Furthermore, during the scanning of the mask 12, the data of the label value memory H1 is written into the label value memory H2, the data of the label value memory H0 is written into the label value memory H1, and the label value of the corresponding pixel's temporarily labelled image data, which is already temporarily labelled image data, is written from a buffer memory into the label value memory H0.

The label values of the envisaged pixel 10 and the pixels connected to the envisaged pixel 10 are stored in an initial label memory ZL. The label values stored in the initial label memory ZL are defined to be initial labels rather than definitely determined temporary label values. Also, a run length counter RUN counts the number of pixels of the envisaged pixel 10 and the pixels connected to it.

During the scanning of the mask 12, a temporary label generating means 22 mainly uses the mask memory 12a, the initial label memory ZL and the run length counter RUN in order to generate the temporarily labelled image data of the corresponding pixel and the temporary label table data, which indicates the conversion relation for modification of the temporary labels.

FIG. 2 through FIG. 6 show flowcharts of the inside of the temporarily labelled image data generating circuit 20 used in the first embodiment according to the present invention.

The processing performed by the temporarily labelled image data generating circuit 20 will be described hereinafter with reference to the flowcharts.

In step 204, variables are initialized prior to starting the processing of one picture.

The numeral ZL denotes an initial label memory. Also, the numeral ZLC denotes a temporary label count memory in which the maximum value +1 of the temporary labels being already regularly issued is stored.

Furthermore, the numeral NL denotes a new label decision flag. If a new connected pixel starts at the currently envisaged pixel, "1" is written into the flag.

Furthermore, the numeral CREG denotes a memory holding the number of horizontal pixels, and the numeral CCNT denotes a horizontal pixel count memory.

Furthermore, the numeral RUN denotes a run length counter, and the numeral HRUN denotes an auxiliary run length counter.

The numeral HZL denotes a previous line temporary label memory.

Furthermore, the numerals H0-H2 denote previous line label value memories. The numerals P1-P2 denote two-valued memories. H0-H2 and P1-P2 correspond to each of the pixels of the mask memory in FIG. 1.

The numeral LCHNG denotes a line feed flag.

Figure 2:
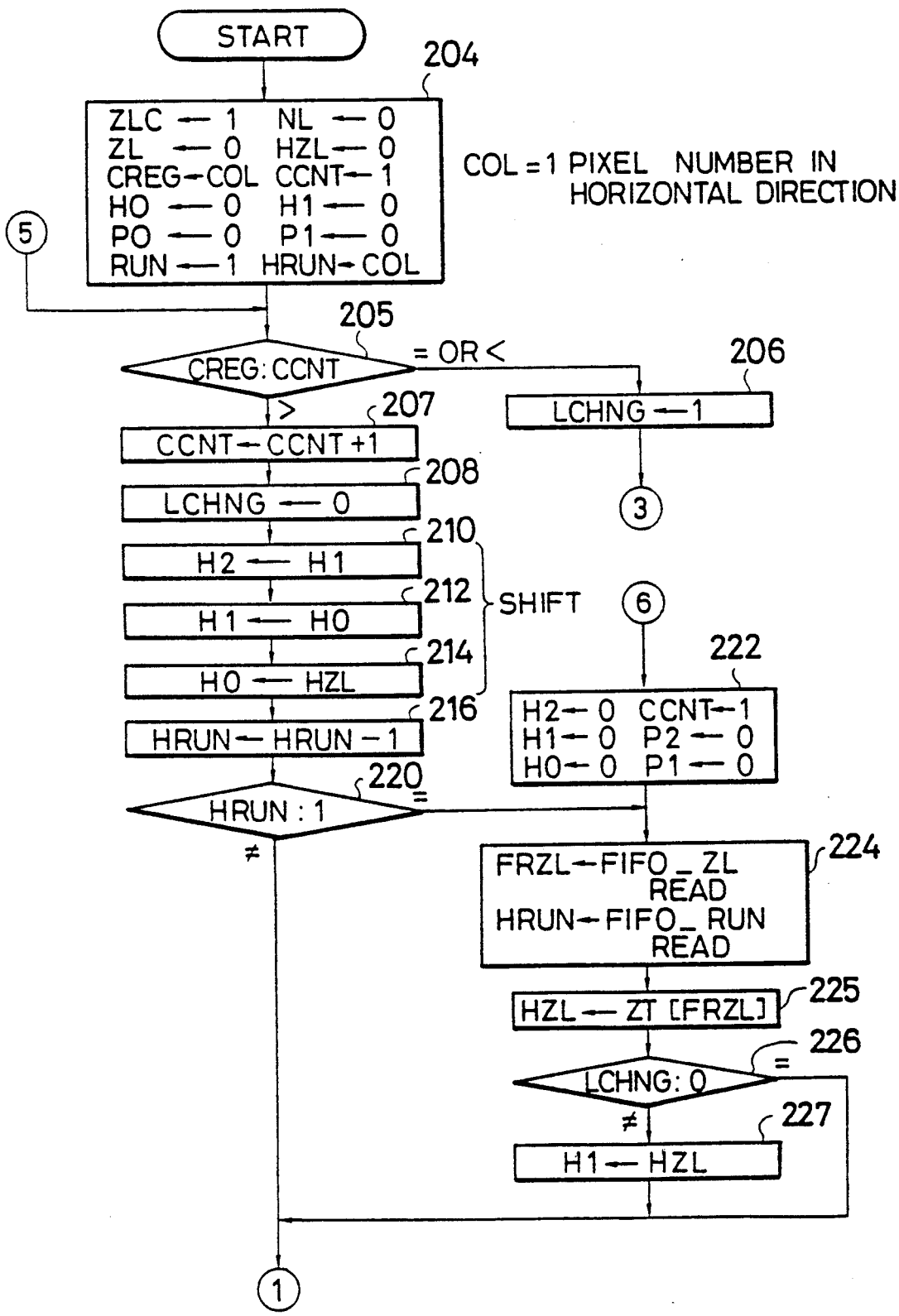
FIG. 2 is a first flowchart showing part of the processing of the first embodiment according to the present invention.

Following step 204, the memory CREG holding the number of horizontal pixels and the horizontal pixel count memory CCNT are compared in step 205 of FIG. 2.

Figure 5:
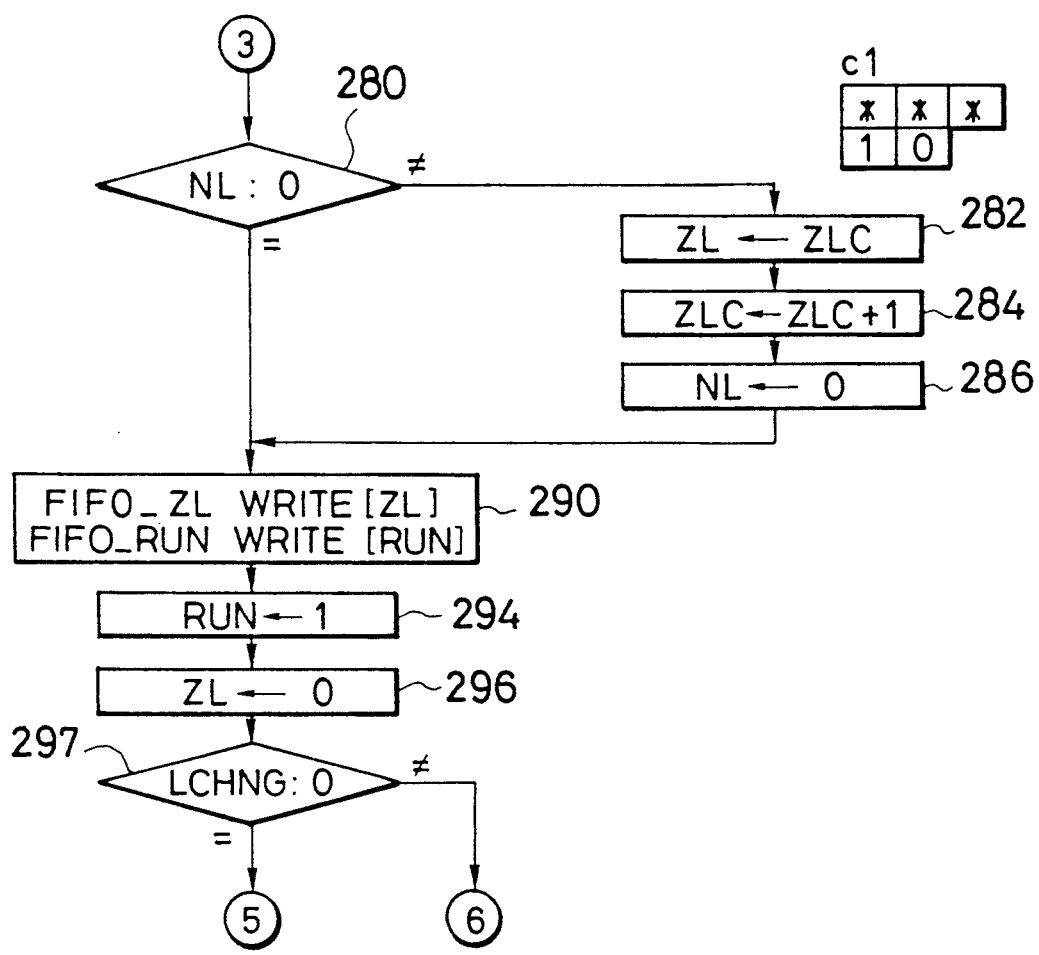
FIG. 5 is a fourth flowchart showing part of the processing of the first embodiment according to the present invention.

If the horizontal pixel count memory CCNT is greater than or equal to the memory CREG holding the number of horizontal pixels, then the line feed flag LCHNG is set in step 206. That is, "1" is written into the line feed flag LCHNG, and then a jump to (3) of the flowchart in FIG. 5 is made.

On the other hand, if the horizontal pixel count memory CCNT is smaller than the memory CREG holding the number of horizontal pixels, then the horizontal pixel count memory CCNT is incremented (addition of "1") in step 207, the line feed flag LCHNG is cleared ("0" is written) in step 208, and then, the processing continues from step 210 onward.

In steps 210-214, the label values of the previous line label value memories H0-H2 are shifted in accordance with the scanning of the envisaged pixel 10 and the mask 12.

In step 216, the value of the auxiliary run length counter HRUN is decremented (subtraction of "1").

In step 220, the decision whether the value of the auxiliary run length counter HRUN is "1" or not is made.

If the auxiliary run length counter HRUN is "1", then, in step 224, the values for a previous line initial label memory FRZL and the auxiliary run length counter HRUN are read from the outside of the temporarily labelled image data generating circuit 20.

The numerals FIFO_ZL and FIFO_RUN in FIG. 2 denote a temporary label buffer memory and a run length buffer memory, respectively. Both memories form a buffer memory (corresponding to the buffer memory 60 described hereinafter) and are FIFO (first-in first-out) memories.

In step 225, a temporary label value is read from the temporary label table ZT at an address being equal to the value of the previous line initial label memory FRZL read out in step 224, and the temporary label value is written into the previous line temporary label memory HZL.

If the value of the line feed flag LCHNG is not "0" in step 226, then the value of the previous line temporary label memory HZL is written into the previous line label value memory H1 in step 227.

Figure 3:
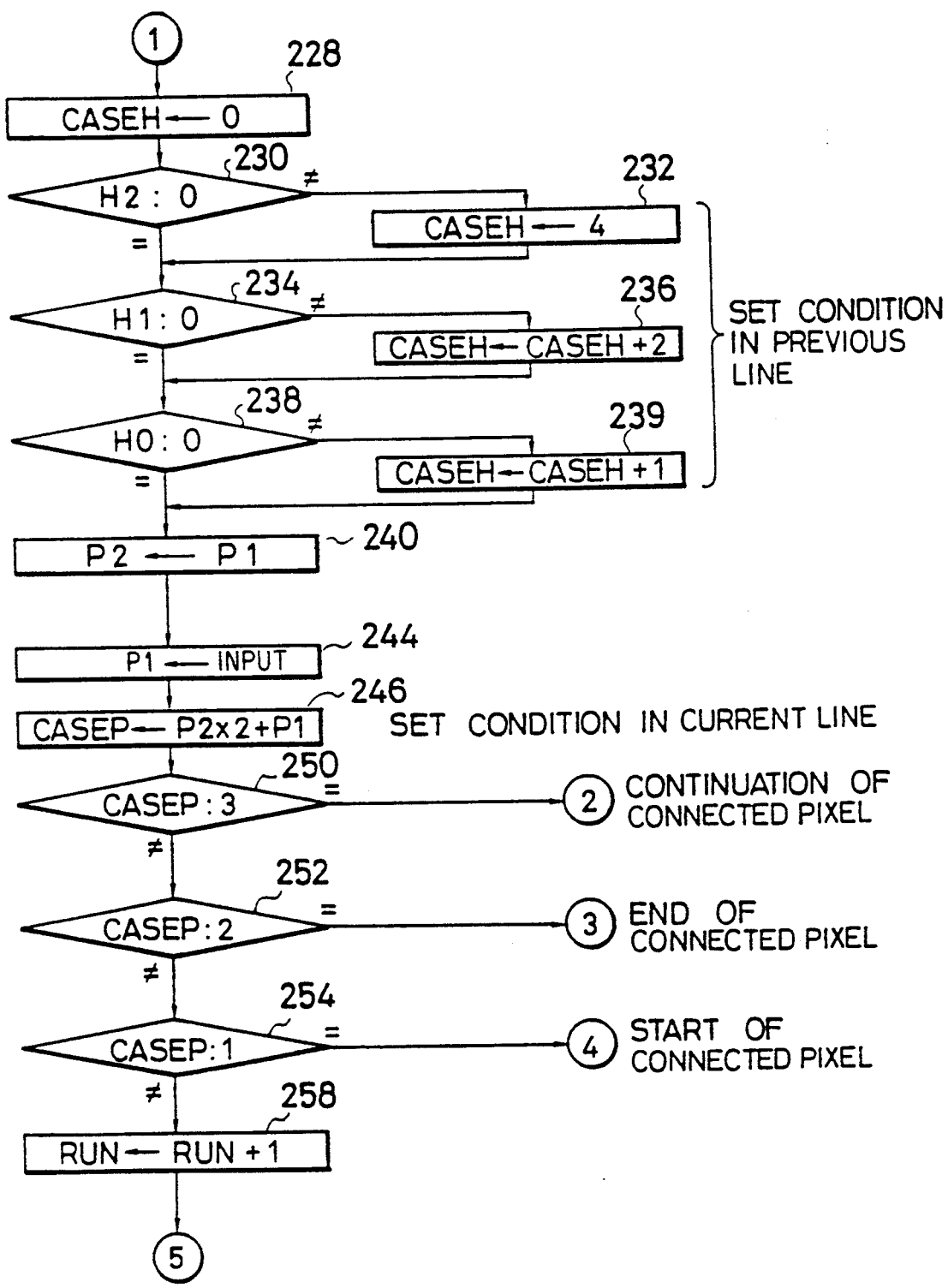
FIG. 3 is a second flowchart showing part of the processing of the first embodiment according to the present invention.

Following the processing of step 226 or step 227, the processing moves to step 228 of FIG. 3.

On the other hand, if the value of the auxiliary run length counter HRUN is not "1" in step 220, then the processing moves to step 228 of FIG. 3.

In step 228 of FIG. 3, "0" is written into a previous line 3-pixel status memory CASEH.

Thereafter, in steps 230 through 239, the data values for the previous line 3-pixel status memory CASEH are determined and written according to whether each of the values of the labels of the pixels on the upper right side, on top of and on the upper left side of the envisaged pixel is "0" or not.

That is, according to steps 230 and 232, if the label value memory H2 for the pixel on the upper left side of the envisaged pixel is not "0", then the bit, whose place is two places higher than the place of the LSB (least significant bit) of the previous line 3-pixel status memory CASEH, becomes "1".

Also, according to steps 234 and 236, if the label value memory H1 for the pixel on top of the envisaged pixel is not "0", then "1" is written into the bit whose place is one place higher than the place of the LSB of the previous line 3-pixel status memory CASEH.

Also, according to steps 238 and 239, if the label value memory H0 for the pixel on the upper right side of the envisaged pixel is not "0", then "1" is written into the LSB of the previous line 3-pixel status memory CASEH.

In step 240 the bit data of the two-valued memory P1 is shifted to the two-valued memory P2. Then, in step 244, bit data is read into the two-valued memory P1 from the outside of the temporarily labelled image data generating circuit 20.

The value of the bit data read into the two-valued memory P1 corresponds to the colour, black or white, of the envisaged pixel 10 in FIG. 1.

In step 246, data is written into a current line 2-pixel status memory CASEP in accordance with the values ("0" or "1") of the updated two-valued memories P1 and P2. That is, if the two-valued memory P1 for the envisaged pixel is "1", then "1" is written into the LSB of the current line 2-pixel status memory CASEP. Also, if the two-valued memory P2 for the pixel left to the envisaged pixel is "1", then "1" is written into the bit whose place is one place higher than the place of the LSB of the current line 2-pixel status memory CASEP.

Figure 4:
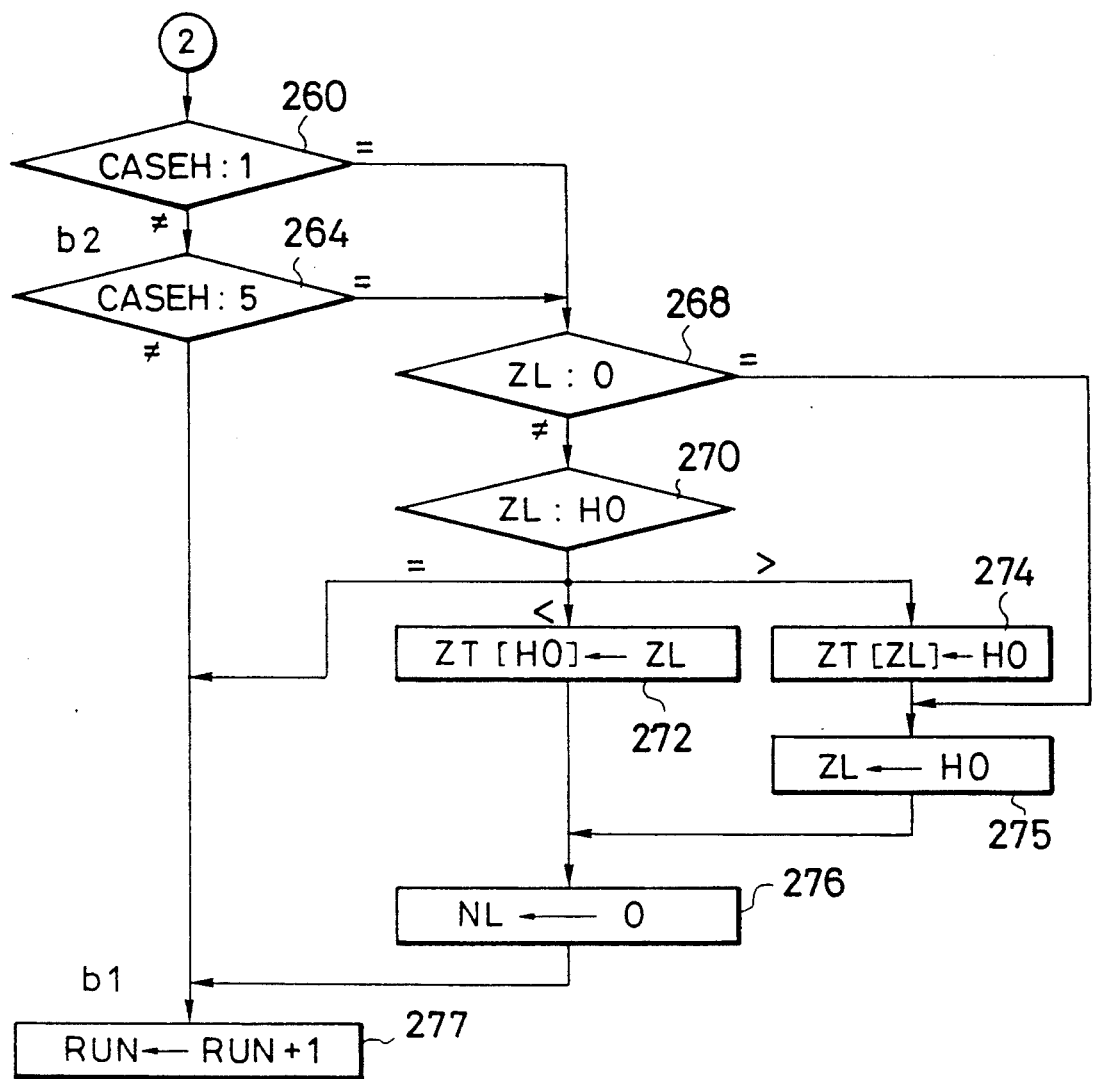
FIG. 4 is a third flowchart showing part of the processing of the first embodiment according to the present invention.
Figure 6:
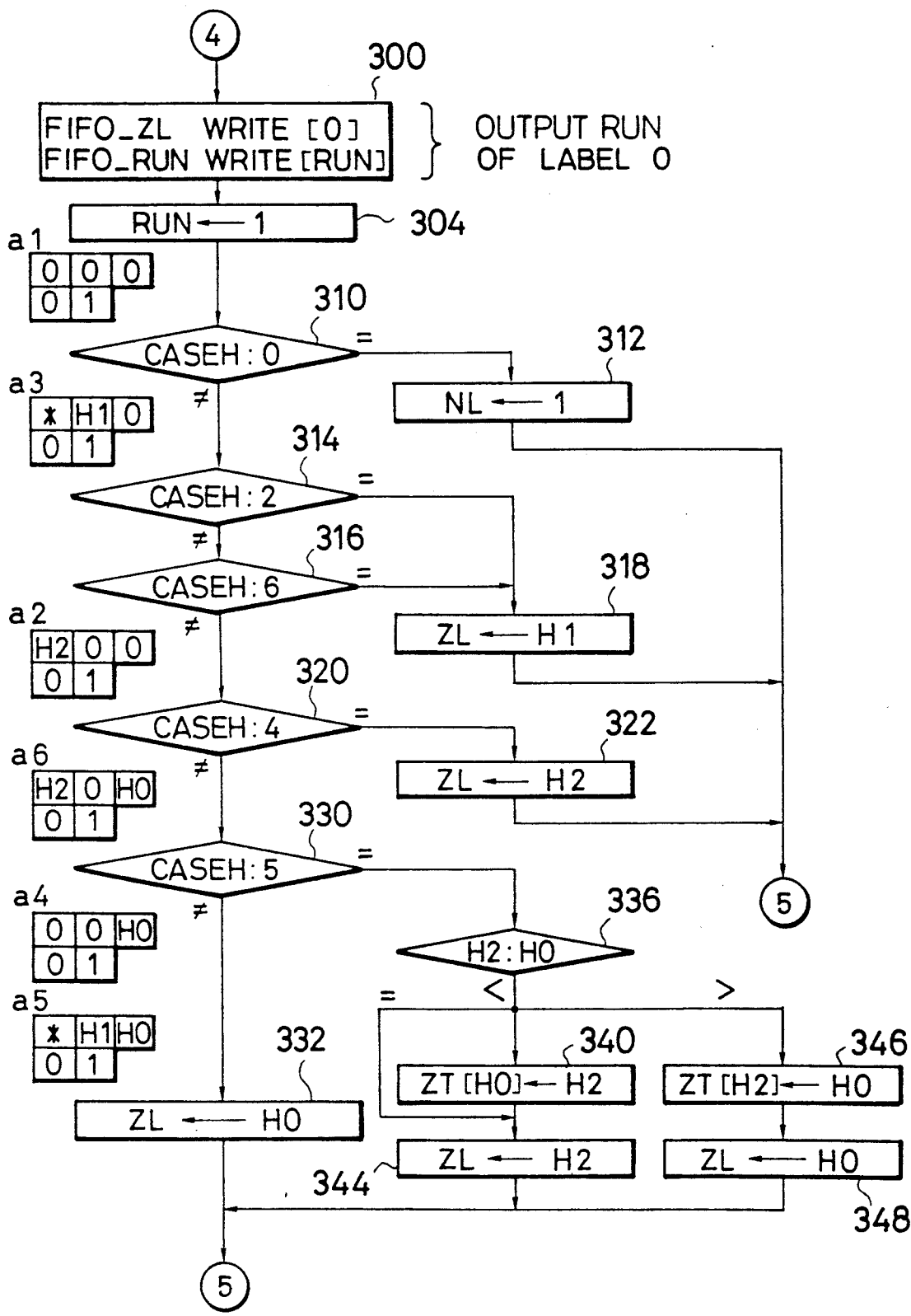
FIG. 6 is a fifth flowchart showing part of the processing of the first embodiment according to the present invention.

In steps 250 through 254, a decision is made in accordance with the value of the current line 2-pixel status memory CASEP whether the processing shown in the flowchart of FIG. 4, the processing shown in the flowchart of FIG. 5, the processing shown in the flowchart of FIG. 6 or the processing of the next step 258 is to be performed.

That is, if the value of current line 2-pixel status memory CASEP is "3", then a jump to (2) in the flowchart of FIG. 4 is made. After the processing shown in the flowchart of FIG. 4 is performed, a jump to (5) in the flowchart of FIG. 2 is made.

Also, if the value of the current line 2-pixel status memory CASEP is "2", then a jump to (3) in the flowchart of FIG. 5 is made. After the processing shown in the flowchart of FIG. 5 is performed, a jump to (5) in the flowchart of FIG. 2 is made.

Also, if the value of the current line 2-pixel status memory CASEP is "1", then a jump to (4) in the flowchart of FIG. 6 is made. After the processing shown in the flowchart of FIG. 6 is performed, a jump to (5) in the flowchart of FIG. 2 is made.

Also, if the value of the current line 2-pixel status memory CASEP is neither "3" nor "2" nor "1", but "0", then the run length counter RUN is incremented (addition of "1") in step 258, whereupon a jump to (5) in the flowchart of FIG. 2 is made.

In the following, the processing which is performed when, in step 250, the value of the current line 2-pixel status memory CASEP is "3" will be described with reference to the flowchart in FIG. 4.

The processing shown in the flowchart of FIG. 4 is executed when the two-valued memory P1 for the envisaged pixel is "1" and the two-valued memory P2 for the pixel left to the envisaged pixel is "1", namely when the connected pixel within the current line and the mask continues to be connected.

If, in steps 260 and 264, the previous line 3-pixel status memory ASEH is "1" or "5", then the processing moves to step 268. Otherwise the processing moves to step 277.

That is, if, in steps 260 and 264, the LSB of the previous line 3-pixel status memory CASEH is "1" and the next least significant bit is "0", namely if the label value memory H0 for the pixel on the upper right side of the envisaged pixel is not "0" and the label value memory H1 for the pixel on top of the envisaged pixel is "0", then a jump to step 268 is made. Otherwise a jump to step 277 is made.

In step 268, a comparison is made to check whether the value of the initial label memory ZL is "0". If the value is "0", then the processing moves to step 275. If the value is not "0", then the processing moves to step 270.

In step 270, the value of the initial label memory ZL and the value of the label value memory H0 for the pixel on the upper right side of the envisaged pixel are compared.

If the value of the initial label memory ZL and the value of the label value memory H0 for the pixel on the upper right side of the envisaged pixel are equal, the processing moves to step 277, following step 270.

If, in step 270, the value of the label value memory H0 for the pixel on the upper right side of the envisaged pixel is greater than the value of the initial label memory ZL, then the smaller value, i.e. the value of the initial label memory ZL, is taken. That is, since the value of the label value memory H0 for the pixel on the upper right side of the envisaged pixel must be modified, in step 272, the value of the initial label memory ZL is written into the temporary label table ZT at an address being equal to the value of the label value memory H0 for the pixel on the upper right side of the envisaged pixel.

On the other hand, if the value of the label value memory H0 for the pixel on the upper right side of the envisaged pixel is smaller than the value of the initial label memory ZL, then the processing moves to step 274, where the smaller value, i.e. the value of the label value memory H0 for the pixel on the upper right side of the envisaged pixel, is written into the temporary label table ZT at an address equal to the value of the initial label memory ZL in step 274. Thereafter, the value of the label value memory H0 is written into the initial label memory ZL in step 275.

Thus, for updating the label values of the temporary label table ZT, the smaller label values are taken.

Accordingly, the value of the temporary label table data, which is written into the temporary label table ZT and which shows the conversion relation for the modification of the temporary labels, is smaller than the value of the address into which the data is written. Therefore, the conversion of the temporary labels in accordance with the temporary label table ZT is a conversion for the modification in the direction of decreasing label values only. That is, the temporary label table ZT has a MAX-MIN format.

After the processing in step 272 or step 275 is completed, the processing in step 276 is performed, and thereafter the processing moves to step 277.

In step 276, the new label decision flag NL is cleared ("0" is written into NL).

In step 277, the run length counter RUN is incremented, and then a jump to (5) in the flowchart of FIG. 2 is made.

In the following, the processing, which is performed under the condition that the previous line 2-pixel status memory CASEP is "2" in step 252 of FIG. 3, will be described with reference to the flowchart in FIG. 5.

The processing shown in the flowchart of FIG. 5 is performed if the two-valued memory P1 for the envisaged pixel is "0" and the two-valued memory P2 for the pixel left to the envisaged pixel is "1".

That is, the processing shown in the flowchart of FIG. 5 is performed if the connected pixel within the current line and the mask becomes disconnected.

In step 280 of FIG. 5, a decision is made whether the new label decision flag NL is "0" or not.

If the new label decision flag NL is not "0", then the processing of steps 282 through 286 is performed. On the other hand, if the new label decision flag NL is "0", then the processing of step 290 is performed.

The label value for the connected pixel within the current line and the mask is stored in the initial label memory ZL. The maximum value of the valid temporary labels, which have been issued so far, is stored in the temporary label count memory ZLC.

If the new label decision flag NL is not "0" in step 280, then the value of the temporary label count memory ZLC is written into the initial label memory ZL, since a new label must be assigned to the connected label, which has become disconnected within the mask. After the value of the temporary label count memory ZLC is incremented in step 284, "0" is written into the new label decision flag NL in step 286.

In step 290 in the flowchart of FIG. 5, with the flowchart being executed when the connected pixel becomes disconnected, the value of the initial label memory ZL and the value of the run length counter RUN, each of which is data of the connected pixel having become disconnected, are output to the temporary label buffer memory FIFO_ZL and the run length buffer memory FIFO_RUN, whose locations are external to the temporarily labelled image data generating circuit 20.

The buffer memory composed of the temporary label buffer memory FIFO_ZL and the run length buffer memory FIFO_RUN is a FIFO (first-in first-out) memory.

The temporarily labelled image data output by the temporarily labelled image data generating circuit 20, which performs the processing shown in the flowcharts of FIG. 2 through FIG. 6, consists of the above-described values of the initial label memory ZL and the run length counter RUN. The output is a write of the temporarily labelled image data into the buffer memory.

Accordingly, circuits using the temporarily labelled image data read the temporarily labelled image data, which consists of the label value and the run length, from the buffer memory.

In step 294 of FIG. 5, "1" is written into the run length counter RUN. Also, in step 296, "0" is written into the initial label memory ZL.

In step 297, a decision is made whether the line feed flag LCHNG is "0" or not.

After the above-described processing shown in the flowchart of FIG. 5 is completed, a jump to (5) in the flowchart of FIG. 2 is made if the line feed flag LCHNG is "0".

On the other hand, if the line feed flag LCHNG is not "0", a jump to (6) in the flowchart of FIG. 2 is made.

In the following, the processing performed when the previous line 2-pixel status memory CASEP is "1" in step 254 in the flowchart of FIG. 3 will be described with reference to the flowchart in FIG. 6.

The processing shown in the flowchart of FIG. 6 is performed if the two-valued memory P1 for the envisaged pixel is "1" and the two-valued memory P2 for the pixel left to the envisaged pixel is "0". That is, the processing is performed if connectedness of the pixels within the current line and the mask begins.

The beginning of connected pixels is defined to be the termination of a state in which pixels are absent, namely the end of the continued presence of pixels with label value "0".

Accordingly, at the time the processing in the flowchart of FIG. 6 starts, the value of the initial label memory ZL is "0".

In step 300 in the flowchart of FIG. 6, the value of the initial label memory ZL, i.e. "0", is written into the temporary label buffer memory FIFO_ZL, and the value of the run length counter RUN is written into the run length buffer memory FIFO_RUN.

In step 304, "1" is written into the run length counter RUN.

If, the value of the previous line 3-pixel status memory CASEH is "0" in step 310, that is, if the three label value memories H0–H2 are all "0", then "1" is written into the new label decision flag NL in step 312, after which a jump to (5) in the flowchart of FIG. 2 is made.

If, the value of the previous line 3-pixel status memory CASEH is "2" in step 314, or if the value of the previous line 3-pixel status memory CASEH is "6" in step 316, then step 318 is executed. That is, if the value of the label value memory H0 for the pixel on the upper right side of the envisaged pixel is "0" and the value of the label value memory H1 for the pixel on top of the envisaged pixel is not "0", then the value of the label value memory H1 for the pixel on top of the envisaged pixel is written into the initial label memory ZL in step 318. Following step 318, a jump to (5) in the flowchart of FIG. 2 is made.

If, the value of the previous line 3-pixel status memory CASEH is "4" in step 320, then step 322 is executed. That is, if the value of the label value memory H0 for the pixel on the upper right side of the envisaged pixel is "0" and the value of the label value memory H1 for the pixel on top of the envisaged pixel is "0" and the value of the label value memory H2 for the pixel on the upper left side of the envisaged pixel is not "0", then the value of the label value memory H2 for the pixel on the upper left side of the envisaged pixel is written into the initial label memory ZL in step 322, after which a jump to (5) in the flowchart of FIG. 2 is made.

If, the value of the previous line 3-pixel status memory CASEH is "5" in step 330, then step 336 is executed. That is, if the value of the label value memory H0 for the pixel on the upper right side of the envisaged pixel is not "0" and the value of the label value memory H1 for the pixel on top of the envisaged pixel is "0" and the value of the label value memory H2 for the pixel on the upper left side of the envisaged pixel is not "0", then the value of the label value memory H0 for the pixel on the upper right side of the envisaged pixel and the value of the label value memory H2 for the pixel on the upper left side of the envisaged pixel are compared in step 336.

When step 336 is executed, the non-connected pixels on the upper right side and upper left side of the envisaged pixel may become a newly connected pixel through the envisaged pixel. Accordingly, the label value (temporary label value) of the pixel on the upper right side of the envisaged pixel and the label value (temporary label value) of the pixel on the upper left side of the envisaged pixel may be different. However, since the envisaged pixel connects the pixels, the processing of steps 336 through 348 equates the two temporary label values of the pixels on the upper right side and upper left side of the envisaged pixel.

In step 336, it is determined which value, the value of the label value memory H0 for the pixel on the upper right side of the envisaged pixel or the value of the label value memory H2 for the pixel on the upper left side of the envisaged pixel, is smaller.

If the value of the label value memory H0 for the pixel on the upper right side of the envisaged pixel is smaller, then, in step 346, the value of the label value memory H0 for the pixel on the upper right side of the envisaged pixel is written into the temporary label table ZT at an address being equal to the value of the label value memory H2 for the pixel on the upper left side of the envisaged pixel. Thereafter, the value of the label value memory H0 for the pixel on the upper right side of the envisaged pixel is written into the initial label memory ZL in step 348.

On the other hand, if, in step 336, the value of the label value memory H2 for the pixel on the upper left side of the envisaged pixel is smaller, then, in step 340, the value of the label value memory H2 for the pixel on the upper left side of the envisaged pixel is written into the temporary label table ZT at an address being equal to the value of the label value memory H0 for the pixel on the upper right side of the envisaged pixel. Thereafter, the value of the label value memory H2 for the pixel on the upper left side of the envisaged pixel is written into the initial label memory ZL in step 344.

Also, if, in step 336, the value of the label value memory H0 for the pixel on the upper right side of the envisaged pixel and the value of the label value memory H2 for the pixel on the upper left side of the envisaged pixel are equal, then the processing moves to step 344 without updating the initial label table ZT. Since the value of the label value memory H0 for the pixel on the upper right side of the envisaged pixel and the value of the label value memory H2 for the pixel on the upper left side of the envisaged pixel are equal, moving to step 348 instead of step 344 will make no difference.

Following the processing of step 348 or step 344, a jump to (5) in the flowchart of FIG. 2 is made.

If, the value of the previous line 3-pixel status memory CASEH is not "5" in step 330, then the processing moves to step 332.

That is, if the value of the previous line 3-pixel status memory CASEH is "1" or "3" or "7", namely if the value of the label value memory H1 for the pixel on top of the envisaged pixel and the value of the label value memory H2 for the pixel on the upper left side of the envisaged pixel are both "0" or only the value of the label value memory H2 for the pixel on the upper left side of the envisaged pixel is "0", then the value of the label value memory H0 for the pixel on the upper right side of the envisaged pixel is written into the temporary label memory ZL in step 332.

The reason for this is that, when step 332 is executed, the envisaged pixel, which begins to be connected, connects to the pixel on the upper right side of the envisaged pixel so that the label value of the envisaged pixel is equal to the temporary label value of the pixel on the upper right side of the envisaged pixel.

After step 332, a jump to (5) in the flowchart of FIG. 2 is made.

The charts in FIG. 7 and FIG. 8 summarize the processing content of the flowcharts of FIG. 2 through FIG. 6, with the processing content corresponding to the mask memory status.

As explained above, according to the first embodiment of the present invention, it is possible to efficiently compose a temporarily labelled image data generating circuit, using the initial label memory or the run length counter which are of a small working memory capacity.

Figure 18:
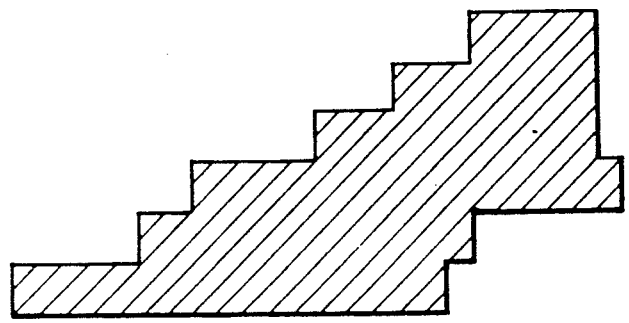
FIG. 18 is a drawing showing a first example of a picture which is the object of the image processing labelling circuit.
Figure 19:
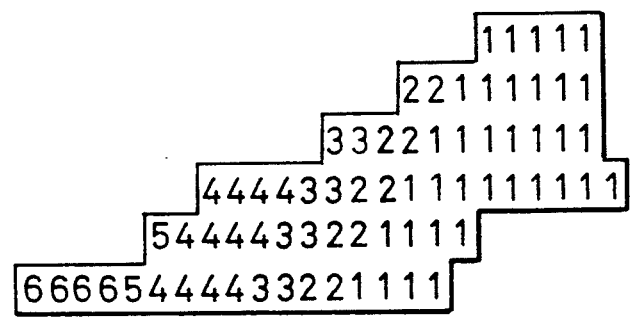
FIG. 19 is a drawing showing a picture to which temporary labels are assigned using a conventional image processing labelling circuit.
Figure 20:
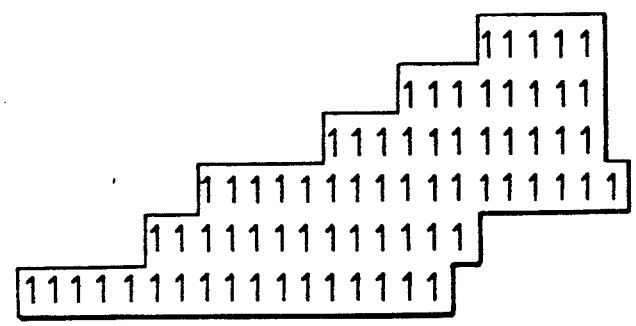
FIG. 20 is a drawing showing a picture to which temporary labels are assigned using the first embodiment according to the present invention.

Also, according to the first embodiment of the present invention, it is possible to obtain, as illustrated in FIG. 20, a labelled picture with only one label value, i.e. "1", for the picture shown in FIG. 18, even during the temporary labelling stage prior to the final labelling stage during which the temporary label values are integrated. Accordingly, it is possible to reduce not only the amount of the subsequent processing required to convert the temporarily labelled image data into finally labelled image data, but also the memory capacity of the temporary label table, which shows the conversion relation for the modification of the temporary labels.

Figure 21:
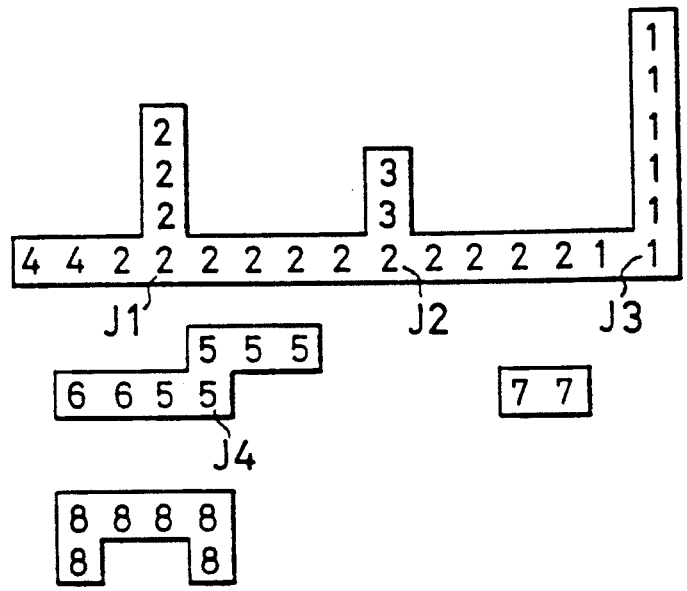
FIG. 21 is a drawing showing a picture to which temporary labels are assigned using a conventional image processing labelling circuit.
Figure 22:
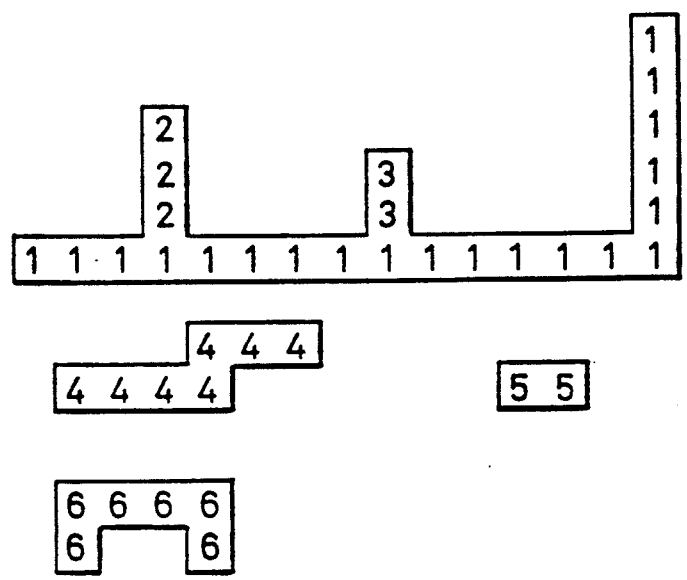
FIG. 22 is a drawing showing a first example of a picture to which temporary labels are assigned using the image processing labelling circuit according to the present invention.

As illustrated by the present embodiment's temporarily labelled picture in FIG. 22, the first embodiment of the present invention provides the possibility of reducing the number (types) of temporary labels when compared with the conventional temporary labelling of the picture shown in FIG. 21.

Figure 9:
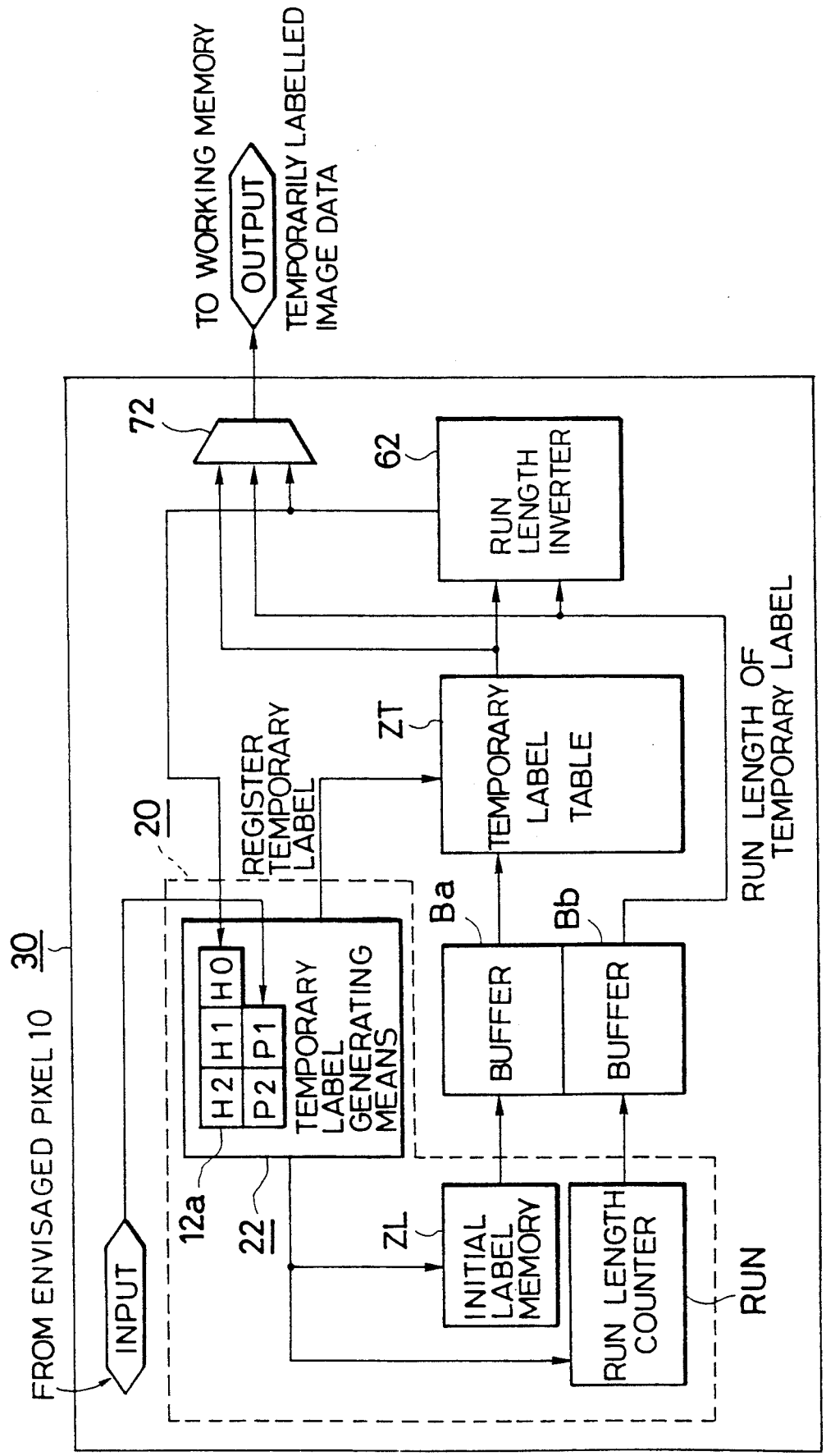
FIG. 9 is a block diagram showing a temporarily labelled image data generating device including the temporarily labelled image data generating circuit of the first embodiment according to the present invention and its peripheral circuits.

FIG. 9 is a block diagram showing a temporarily labelled image data generating device, including the temporarily labelled image data generating circuit of the first embodiment according to the present invention and its peripheral circuits.

The main components of the temporarily labelled image data generating device 30 in FIG. 9 are the temporarily labelled image data generating circuit 20 of the first embodiment, buffers Ba and Bb, a temporary label table ZT, a run length inverter 62 and a switch 72.

The buffer Ba is used during the process of entering the temporary label table data, which is output by the temporarily labelled image data generating circuit 20, into the temporary label table ZT.

The buffer Bb is used during the process of entering the temporarily labelled image data, which is output by the temporarily labelled image data generating circuit 20, into the run length inverter 62 and the switch 72.

The temporary label table ZT is identical with the table described hereinafter with reference to FIG. 10.

The run length inverter 62 generates temporarily labelled image data, which is the temporary label for each pixel, from the temporarily labelled image data consisting of the temporary label and the run length, with the temporarily labelled image data being output by the buffer Bb.

The switch 72 selects the output of the temporarily labelled image data generating device 30 from among the output of the buffer Bb, the output of the run length inverter 62 and the output of the temporary label table ZT.

Figure 10:
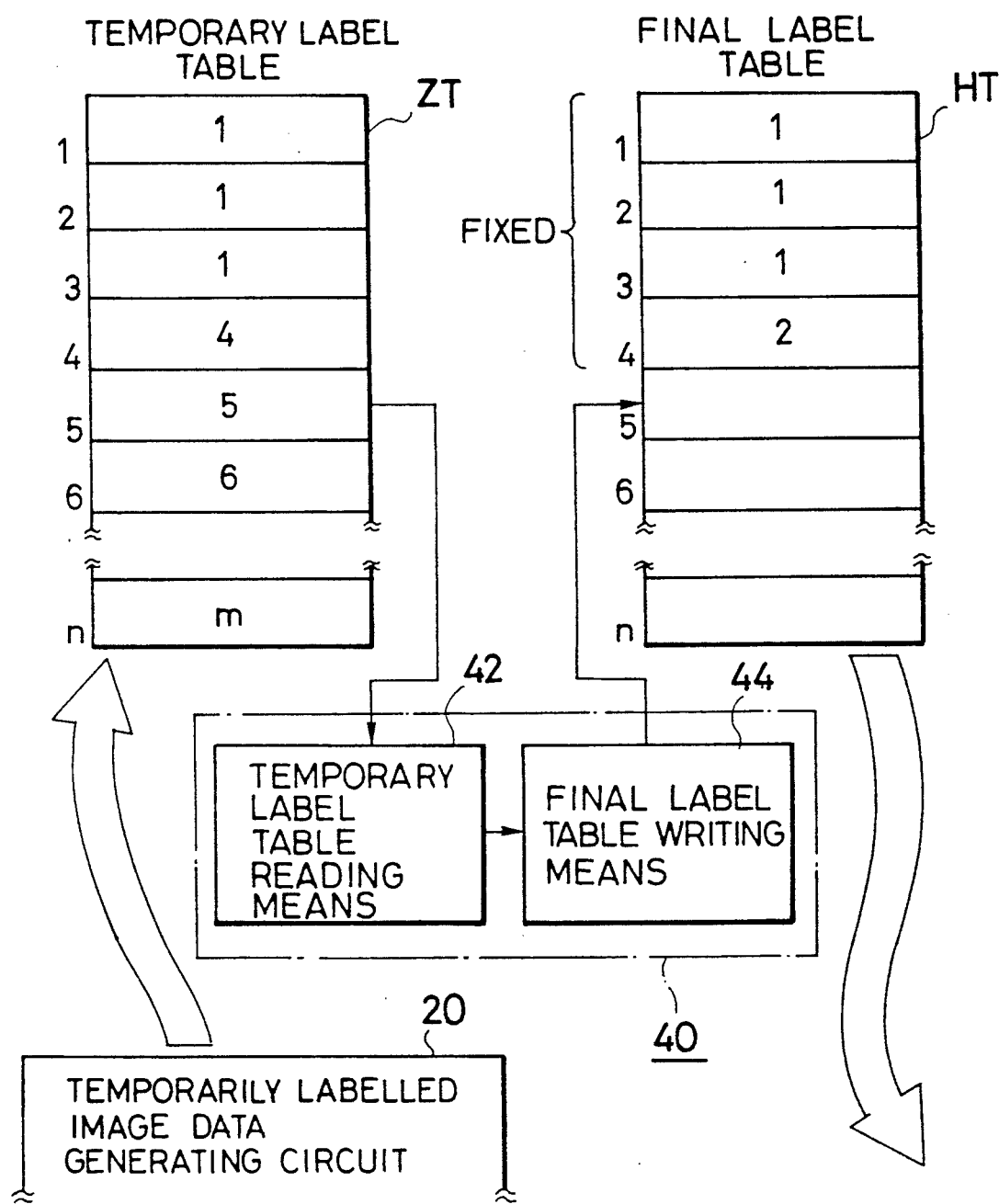
FIG. 10 is a block diagram showing the second and third embodiment according to the present invention.

FIG. 10 is a block diagram of the second and third embodiments according to the present invention.

FIG. 10 shows the final label table generating circuit 40, which writes the result of the label table arrangement of the temporary label table ZT into the final label table HT, following the label table arrangement of the temporary label table ZT.

In FIG. 10, the temporary label table ZT is generated by the temporarily labelled image data generating circuit 20.

The temporarily labelled image data generating circuit of the first embodiment according to the present invention may be used for the temporarily labelled image data generating circuit 20. Moreover, the conventional label relation table generating circuit, which uses the label generator 300, the internal label buffer 500, and the like of FIG. 1 of Japanese Patent Laid-Open Application 9478/1987, may also be used for the temporarily labelled image data generating circuit 20. That is, a circuit that writes data, which shows the conversion relation for the modification of the temporary labels, so that the temporary label table ZT becomes a table in MAX-MIN format, is sufficient.

In FIG. 10, a temporary label table reading means 42 sequentially reads the data of the temporary label table ZT at each address from address "1" to "n", and outputs the value of the data read and the value of the address, at which the temporary label table ZT was read, to a final label table writing means 44, each time a read-out is made.

The final label table writing means 44 first of all compares the value of the address, at which the read-out was made, with the value of the data read, with the value of the address and the value of the data being entered by the temporary label table reading means 42.

If the value of the address, at which the read-out was made, and the value of the data read are equal, then the temporary value, which is expressed by the value of the address at which the read-out was made, does not require label modification and can be taken as the final label.

Accordingly, if the value of the address at which the read-out was made and the value of the data read are equal, that is, if conversion is not required, then the final label table writing means 44 writes the value of the final label counter, which generates continuous final labels, into the final label table at an address whose value is equal to the value of the address at which the temporary label table ZT was read.

On the other hand, if the value of the address, at which the read-out was made, and the value of the data read are not equal (since the table is a table in MAX-MIN format, it follows that (the value of the address at which the read-out was made)>(the value of the data read)), then the temporary label value expressed by the value of the address, at which the read-out was made, must be converted to the temporary label value (or final label value) expressed by the value of the data read.

Accordingly, if the value of the address, at which the temporary label table was read, and the value of the data read are not equal, that is, if a conversion of the temporary label expressed by the value of the address at which the temporary label table ZT was read, is required, then the final label table writing means 44 determines the conversion target label value, that is the final label value, and writes the value into the final label table HT at a final label table address whose value is equal to the value of the address at which the read-out of the temporary label table was made.

The final label table writing means 44 is capable of reading data from the final label table at an address whose value is equal to the value of the data read from the temporary label table and of directly converting the data of the final label table into a definitely determined conversion target label value for the modification of the temporary label, if a conversion of the temporary label value expressed by the value of the address, at which the temporary label table ZT was read, is required.

This is due to the MAX-MIN format of the temporary label table ZT, because the MAX-MIN format implies that the conversion for the modification of the temporary labels in accordance with the data of the temporary label table ZT is such that the conversion target label value is invariably smaller than the conversion source label value, and moreover, this is due to the final label table generating circuit 40, because the final label table generating circuit 40 sequentially arranges the label table in the increasing order of the address values of the temporary label table (the address values corresponding to the temporary conversion source label values).

That is, this is due to the final label table writing means 44, which decided that a conversion of the temporary label value is required, and the conversion target label value, which is read from the final label table in accordance with the decision of the final label table writing means 44, invariably being a definitely determined label value, that is a final label value.

At least some of the processing of the temporary label table reading means 42 and the final label table writing means 44 can be performed simultaneously. Also, since the temporary label table ZT and the final label table HT are independent tables, a read from the temporary label table ZT and a read or write of the final label table HT can be executed simultaneously.

Figure 11:
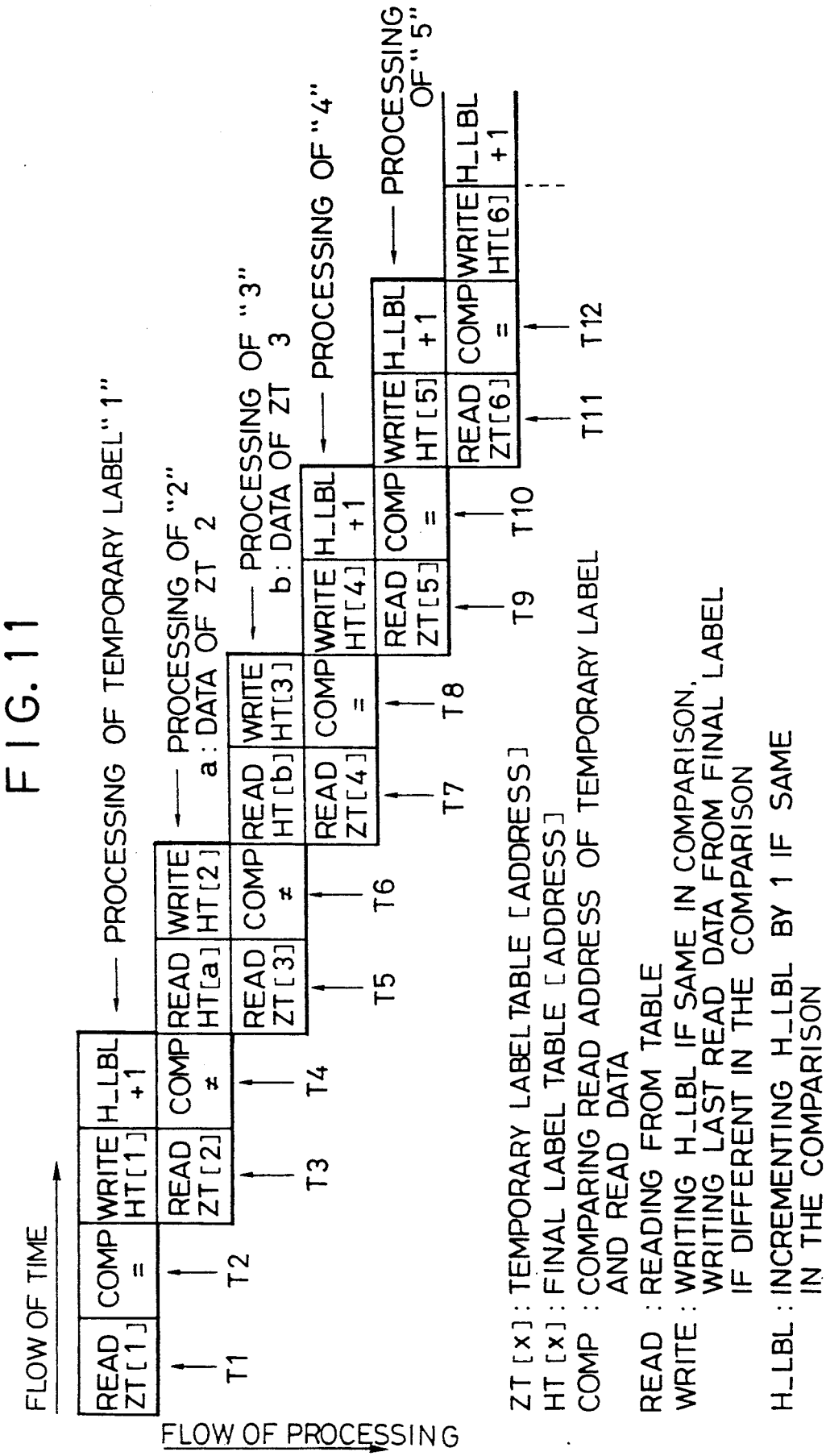
FIG. 11 is a sequence diagram of the second embodiment according to the present invention.

FIG. 11 is a sequence diagram showing the processing of the temporary label table reading means and the final label table writing means of the second embodiment according to the present invention.

That is, the second embodiment is the embodiment which uses the sequence of FIG. 11 for the processing of the above-described FIG. 10.

In FIG. 11, the flow of the processing for the label table arrangement is from top to bottom. Also, the left-to-right direction indicates the flow of time. Numerals T1-T12 denote times.

In FIG. 11, ZT[x] denotes the data in the temporary label table ZT at the address with the address value x, and HT[x] denotes the data in the final label table HT at the address with the address value x.

Furthermore, COMP relates to the temporary label table data read during the immediately preceding read-out and denotes a comparison between the value of the address at which the read-out was made and the value of the data read. In the chart, the signs of equality and inequality below COMP indicate the result of the comparison.

Furthermore, READ indicates a read from the table address shown below READ. That is, "READ ZT[1]" indicates that data is read from the temporary label table at an address of the value "1", and "READ HT[a]" indicates that data is read from the final label table at an address of the value "a".

WRITE indicates that data is written into the address with the value shown below WRITE. For example, "WRITE HT[2]" indicates that data, which was read from the temporary label table or final label table during the immediately preceding read-out, is written into the final label table HT at an address of the address value "2".

In FIG. 11, the temporary label table ZT is read at the specified addresses at times T1, T3, T5, T7, T9 and T11, respectively.

Also, at times T3, T9 and T11, the read-out of the temporary label table ZT and the write of the final labels into the final label table are performed simultaneously, with the final labels corresponding to the temporary labels read from the temporary label table during the previous read-out.

Also, at times T5 and T7 the read-out from the temporary label table ZT and the read-out of data form the final label table at an address whose value is equal to the value of the data read from the temporary label table ZT are performed simultaneously, with the read-out from the temporary label table ZT being performed because a conversion of the temporary label value corresponding to the value of the address at which the temporary label table ZT was read during the previous read-out is required.

Thus, some of the processing of the temporary label table reading means 42 and the final label table writing means writing means 44 is performed simultaneously in the final label table generating circuit of the second invention according to the present embodiment. Therefore, it is not only possible to reduce the processing time required by the final label table generating circuit 40 to complete the entire arrangement of the label table (generation of the data of the final label table HT), but it is also possible to complete the whole processing within a fixed specified processing time Ta. That is, if the number of data written into the final label table HT is n, then the processing time Ta required to complete the generation of the data of the final label table HT can be expressed by the following formula:

$$Ta1 = 2 \times n + 1 \quad \text{(if the COMP processing for the last temporary label results in equality)} \tag{1}$$

-continued $Ta2 = 2 \times n + 2$ (if the COMP processing for the last temporary label results in inequality)

In FIG. 11, the time at which, for example, the processing of the temporary label value "5" (n=5) is completed is T11 ($2\times5+1$).

Figure 12:
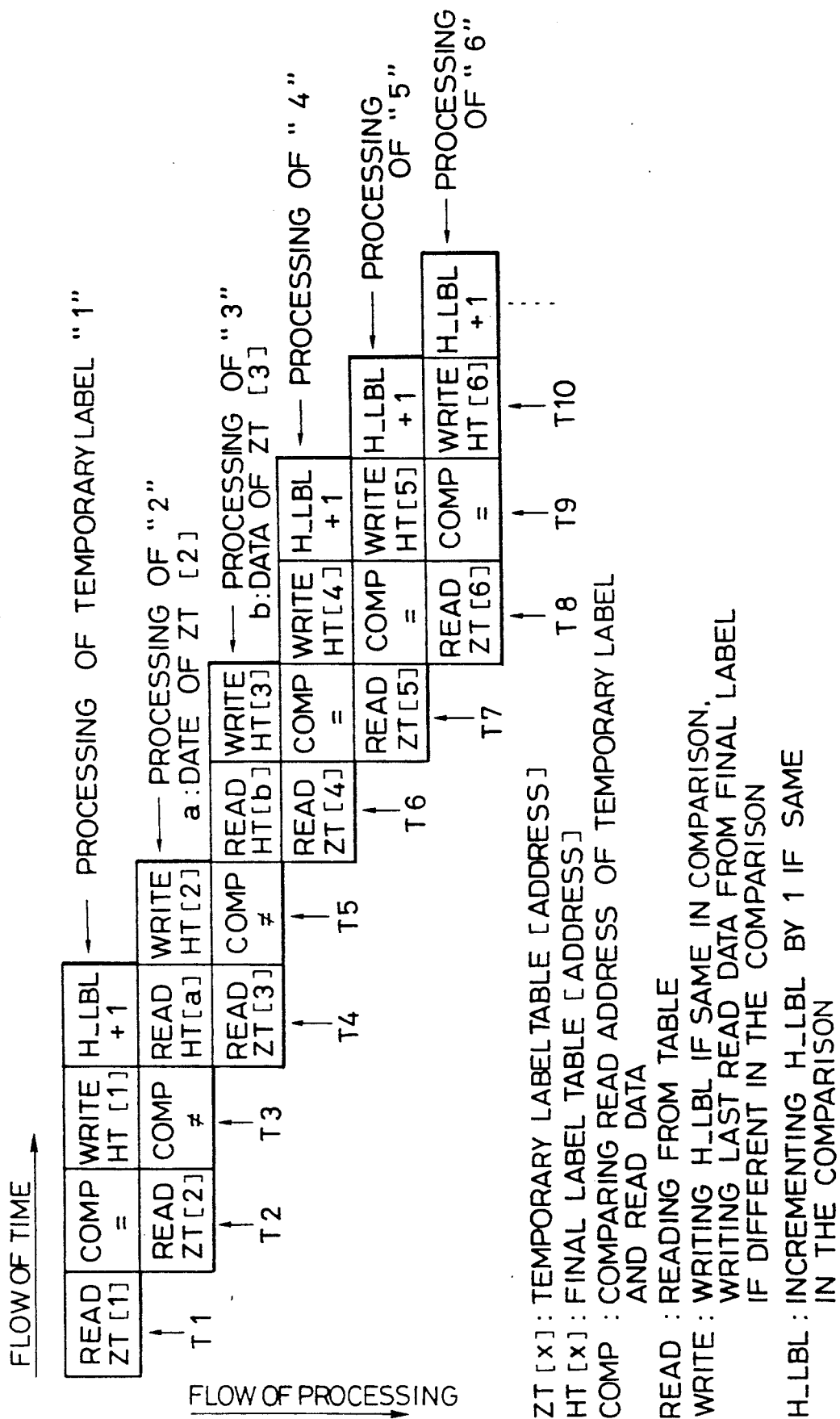
FIG. 12 is a sequence diagram of the third embodiment according to the present invention.

FIG. 12 is a sequence diagram showing the processing of the temporary label table reading means and the final label table writing means of the third embodiment according to the present invention.

That is, the third embodiment is the embodiment which uses the sequence of FIG. 12 for the processing of the above-described FIG. 10.

In FIG. 12, the flow of the processing for the label table arrangement is from top to bottom. Also, the left-to-right direction indicates the flow of time.

The numerals T1-T10, ZT[x], HT[x], COMP, READ and WRITE in FIG. 12 have the same meaning as the corresponding numerals in FIG. 11.

In FIG. 12, the amount of processing performed simultaneously is larger than that in FIG. 11, thus the entire processing time is reduced.

In FIG. 12, the temporary label table ZT is read at specified addresses at times T1, T2, T4, T6, T7 and T8, respectively.

In particular, the read-out of the temporary label table ZT at times T2, T7 and T8 is performed immediately after the previous read-out of the temporary label table ZT. That is, the processing of the temporary labels "2", "5" and "6" starts one time interval earlier.

Therefore, since the processing of the temporary label "2" starts at an earlier stage, the processing of the temporary label "3" also starts at an earlier stage, and the processing of the temporary label "3" and some processing of the temporary label "1" are performed simultaneously, with the processing of the temporary label "1" having started two time intervals earlier. The processing of the temporary label "5" starts at an earlier stage, and the processing of the temporary label "5" and some processing of the temporary label "3" are performed simultaneously, with the processing of the temporary label "3" having started two time intervals earlier. The processing of the temporary label "6" starts at an earlier stage, and the processing of the temporary label "6" and some processing of the temporary label "4" are performed simultaneously, with the processing of the temporary label "4" having started two time intervals earlier.

Accordingly, at times T4, T7, T8 and T9 three temporary labels are processed simultaneously.

On the other hand, the processing of the temporary labels "3" and "4" does not start at an earlier stage.

The reason for this is that the comparison "COMP" during the processing of the temporary labels "2" and "3" resulted in inequality, the processing of the temporary labels "2" and "3" having started two time intervals earlier than that of the temporary labels "3" and "4". That is, if the processing of the temporary labels "3" and "4" starts at an earlier stage, then the "READ HT[b]" of the processing of the temporary label "3" and the "WRITE HT[2]" of the temporary label "2" overlap and the "WRITE HT [4]" of the processing of the temporary label "4" and the "WRITE HT[3]" of the temporary label "3" overlap, resulting in a simultaneous access of the final label table.

Accordingly, if the number of data written into the final label table is n, then the processing time Tb required to complete the generation of the data of the final label table of the third embodiment can be expressed by the following formula:

$$Tb = (2 \times n + 2) - m \quad (2)$$

where m is the number of temporary label table data, which is to be processed and whose address value is equal to the value of the data itself. However, even if the address value of the data is equal to the value of the data itself, the data is not to be included in m, if the data is the last data among the temporary label table data which is to be processed.

It is obvious from a comparison of formulas (1) and (2) that the processing time of the third embodiment is shorter than that of the second embodiment.

Figure 13:
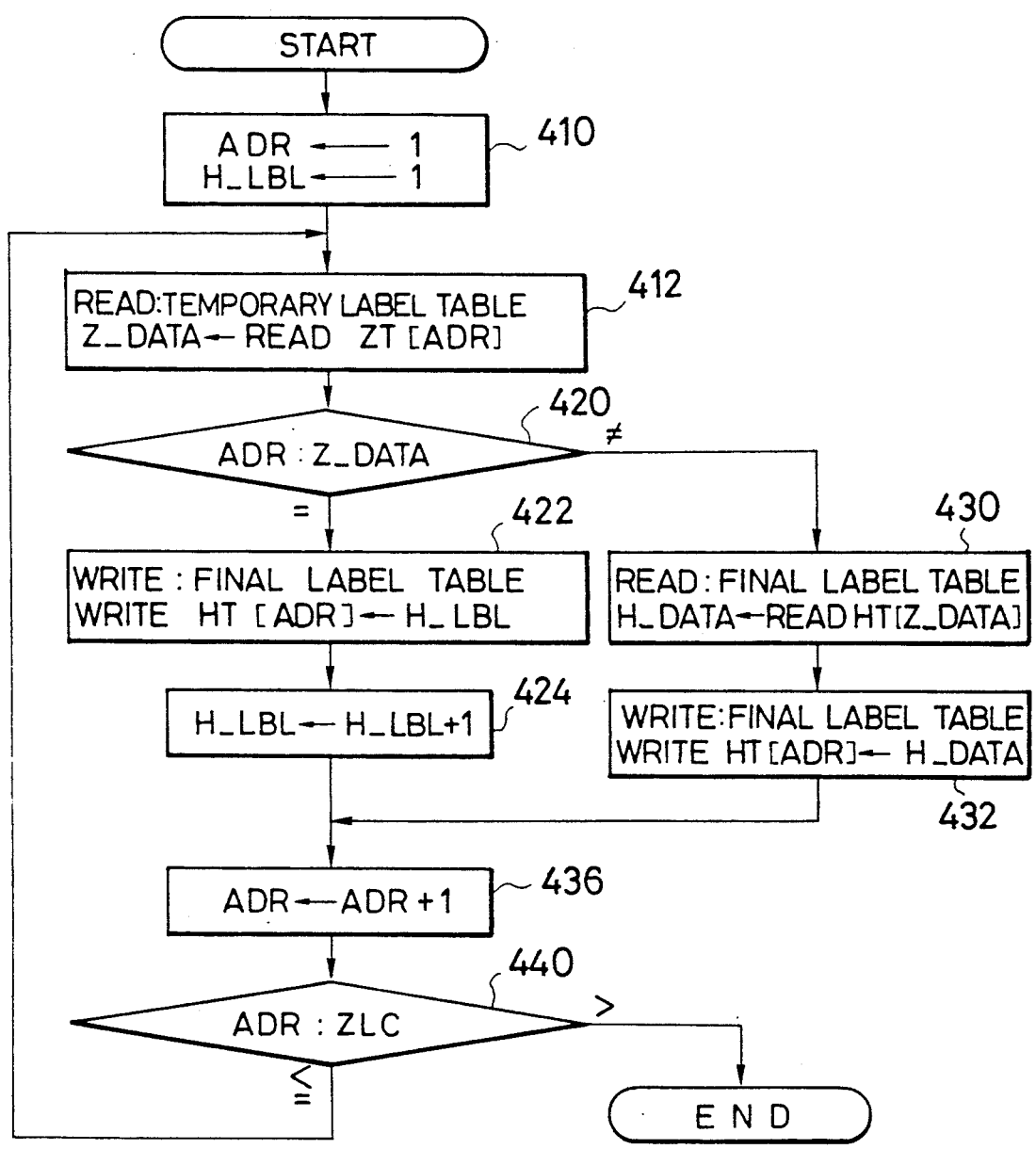
FIG. 13 is a flowchart showing the processing of the second and third embodiments according to the present invention.

FIG. 13 is a flowchart showing the processing of the final label table generating circuit 40 of the second and third embodiments according to the present invention.

As described above, since some processing is performed simultaneously by the temporary label table data reading means 42 and the final label table data writing means 44 of the final label table generating circuit 40, it is difficult to describe the processing of the final label table generating circuit 40 in one flowchart. However, the flowchart in FIG. 13 was made by focusing attention on the label table arrangement for one temporary label value.

In step 410 of FIG. 13, the initial value "1" is written into an address value memory ADR and a final label value memory H_LBL.

In step 412, the temporary label table data reading means 42 reads data from the temporary label table ZT at an address whose value is equal to the value of the data of the address value memory ADR and then the data is written into a temporary label data memory Z_DATA.

The processing of steps 420 to 440 is performed in the final label table data writing means 44.

In step 420, the value of the address value memory ADR and the value of the temporary label data memory Z_DATA are compared. That is, by comparing the value of the address at which the temporary label table ZT was read with the data read, an evaluation is made whether a conversion for the modification of the temporary label represented by the value of the address at which the temporary label table ZT was read is required or not.

If the value of the address value memory ADR and the value of the temporary label data memory Z_DATA are equal, that is, if a conversion of the temporary label value is not required, the processing moves to step 422.

In step 422, the value of the data of the final label value memory H_LBL is written into the final label table HT at an address whose value is equal to the value of the data of the address value memory ADR.

Following step 422, the final label value memory H_LBL is incremented in step 424.

On the other hand, if, in step 420, the value of the data of the address value memory ADR and the value of the data of the temporary label data memory Z_DATA are not equal, then the processing moves to step 430.

In step 430, the label value, which is already definitely determined (final label value), is read from the final label table HT at an address whose value is equal to the value of the data of the temporary label data memory Z_DATA and then the final label value is written into the final label data memory H_DATA.

In step 432, the data of the final label table memory H_DATA is written into the final label table HT at an address whose value is equal to the value of the data of the address value memory ADR.

After the processing of the above-described steps 424 or 432 is completed, the processing moves to step 436.

In step 436, the address value memory ADR is incremented.

In step 440, the value of the data of the address value memory ADR and the value of the data of the temporary label count memory ZLC are compared and an evaluation is made whether the label table arrangement of the temporary label table ZT is completed or not.

That is, if the value of the data of the address value memory ADR is smaller than or equal to the value of the data of the temporary label count memory ZLC, then a jump to just in front of step 412 is made. On the other hand, if the value of the address value memory ADR is greater than the value of the temporary label count memory ZLC, then the processing shown in the flowchart of FIG. 13 is terminated.

The temporary label count memory ZLC corresponds to the temporary label count memory ZLC of the temporarily labelled image data generating circuit illustrated in the flowcharts of FIGS. 2 to 6. That is, the value written into the temporary label count memory ZLC of FIG. 13 is the total number of temporary labels written and generated by the temporarily labelled image data generating circuit of FIGS. 2 through 6.

The temporarily labelled image data generating circuit, which writes the value of the temporary label count memory ZLC, is not restricted to the temporarily labelled image data generating means illustrated in the flowcharts of FIGS. 2 to 6. That is, any other temporarily labelled image data generating circuit will suffice, provided that it generates a temporary label table in MAX-MIN format and writes the value of the temporary label count memory ZLC (whose value is equal to the number of temporary labels).

Figure 14:
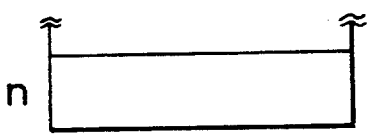
FIG. 14 is a chart showing the final label table generated in the second and third embodiments according to the present invention.

FIG. 14 is a chart showing the final label table generated in the above-described second and third embodiments according to the present invention.

The data written into each address of the temporary label table ZT of FIG. 10 is an example which illustrates temporary label table data showing, for the case where temporary labels are assigned to the picture shown in FIG. 22, the conversion relation for the modification of the temporary labels.

According to the second or third embodiment of the present invention, the data in the temporary label table ZT of FIG. 10 at the address of the value "38 is directly rewritten to "1", thus providing a quick arrangement of the label table.

Figure 15:
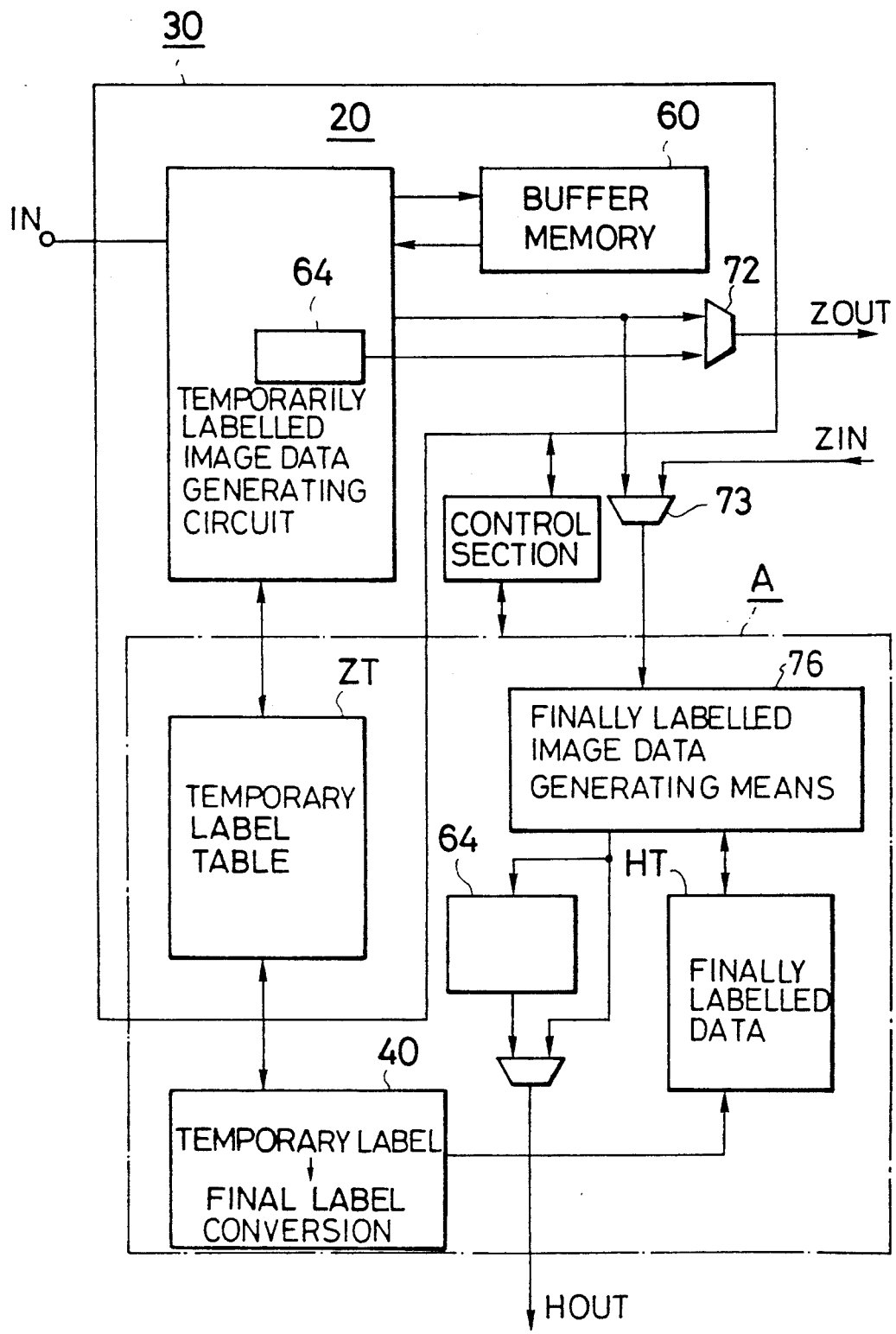
FIG. 15 is a block diagram of the fourth embodiment according to the present invention.

FIG. 15 is a block diagram of the fourth embodiment according to the present invention.

The fourth embodiment according to the present invention uses a combination of the above-described first, and second or third embodiment according to the present invention.

That is, in FIG. 15, the first embodiment according to the present invention is used for the temporarily labelled image data generating circuit 20, and the portion A indicated by one dot chain line uses the second embodiment according to the present invention.

The buffer memory 60 in FIG. 15 uses FIFO memories. The value of the definitely determined initial label memory ZL and the value of the definitely determined run length counter RUN of the above-described first embodiment according to the present invention are written into the buffer memory 60. That is, the image data, which is output by the temporarily labelled image data generating circuit 20 and which is composed of the temporary label value and the run length value, is written into the buffer memory 60.

Also, the switch 72 selects the type of the temporarily labelled image data which is output to an output ZOUT.

That is, the image data consisting of the temporary label value and the run length value, which are directly output from the buffer memory 60, may be taken for the temporarily labelled image data, which is output from the output ZOUT. Furthermore, it is also possible, through a selection made by switching the switch 72, to output the temporarily labelled image data, which consists of the temporary label value and the run length value output from the buffer memory 60, as normal temporarily labelled image data, which consists of a temporary label value for each pixel, from the output terminal ZOUT using the run length inverter 64.

On the other hand, the data relating to the conversion relation for the modification of temporary labels is written into the temporary label ZT. This data is output from the temporarily labelled image data generating circuit 20 and indicates conversion relations for the modification of label values, the conversion being such that the label values are modified in decreasing label value order only.

Also, the final label table generating circuit 40, which consists of the temporary label table data reading means 42 and the final label table data writing means 44, performs the label table arrangement processing for the data written into the temporary label table ZT and writes the data into the final label table HT.

Furthermore, the data, which shows the relationship between the definitely determined temporary label values written into the final label table HT and the final label values, can be read from the output HOUT, as required.

Furthermore, in order to write data into the label value memory H0 for the pixel on the upper right side of the envisaged pixel, the label value memory H0 being part of the mask memory 12a of the temporarily labelled image data generating circuit 20 shown in FIG. 1, the temporarily labelled image data, which are output from the buffer memory 60, are also input into the temporarily labelled image data generating circuit 20, following a conversion of the temporarily labelled image data into normal temporarily labelled image data consisting of a temporary label value for each pixel by means of the run length inverter 64.

According to the fourth embodiment of the present invention, it is possible to obtain excellent results by providing a combination of the advantageous features of the first, and second or third embodiment of the present invention.

Figure 23:
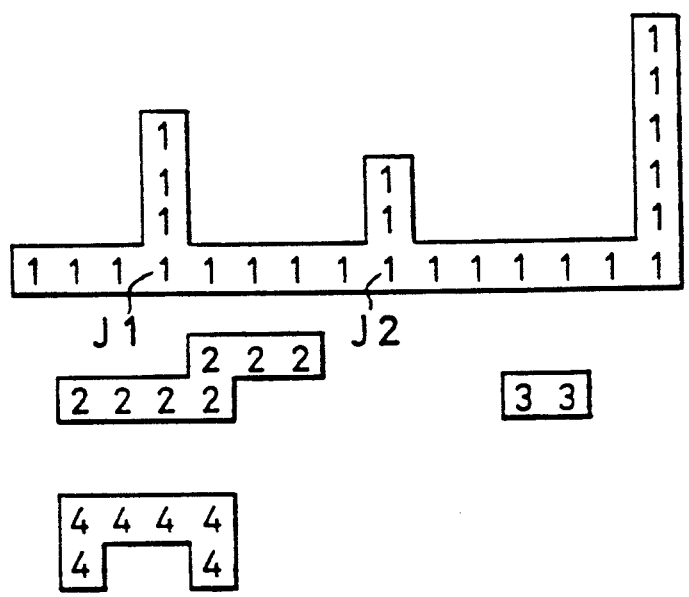
FIG. 23 is a drawing showing a second example of a picture to which temporary labels are assigned using the image processing labelling circuit according to the present invention.

According to the final label table of the present invention's fourth embodiment, it is possible to obtain a picture as shown in FIG. 23.

Figure 16:
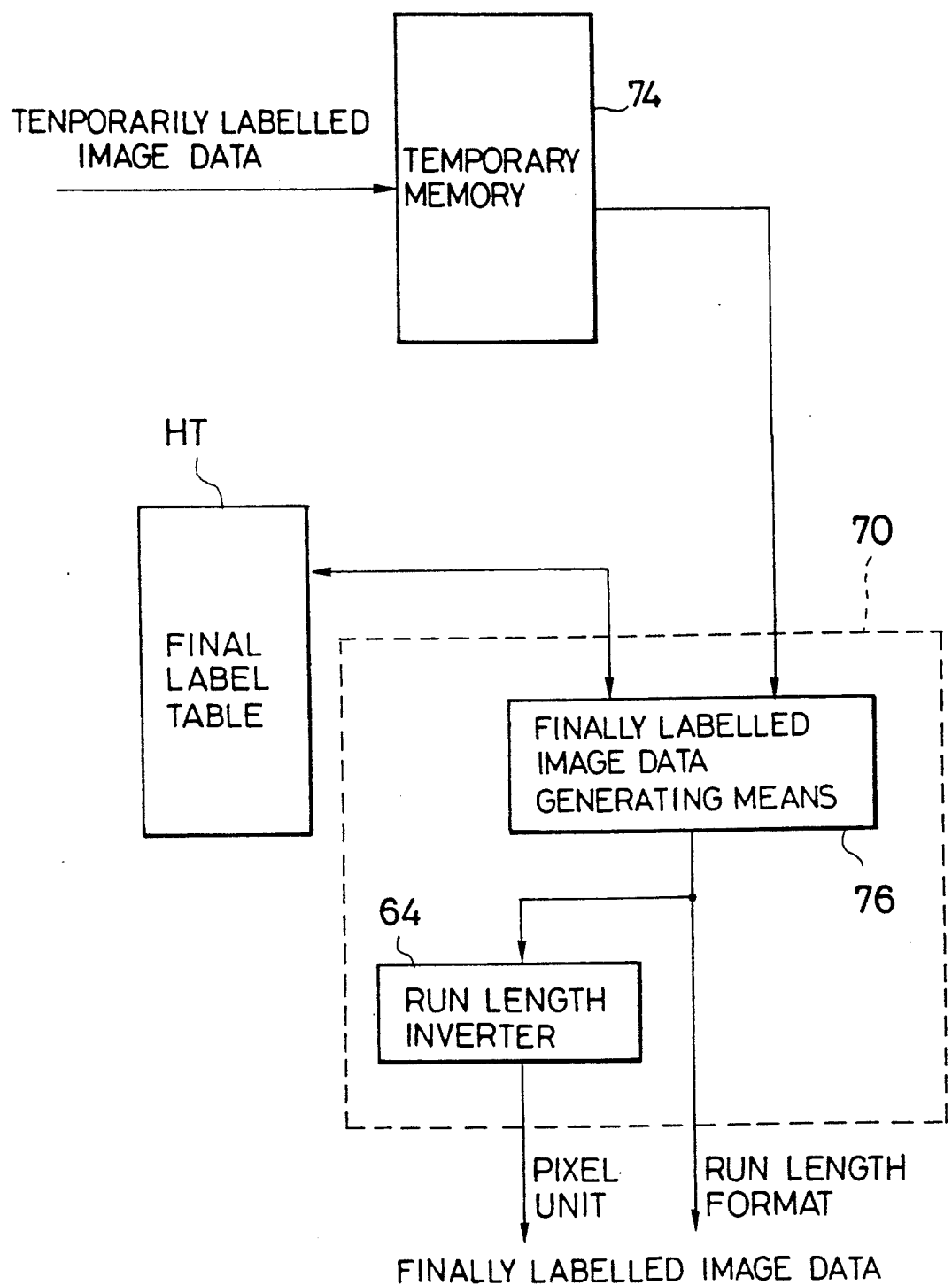
FIG. 16 is a block diagram of a finally labelled image data generating circuit.

FIG. 16 is a block diagram of the circuit which generates the finally labelled image data.

In FIG. 16, the numerals 64 and HT have the same meaning as the corresponding numerals in FIG. 15.

Also, a temporary memory 74 is a FIFO buffer memory and may be provided as required. The data written into the temporary memory 74 is the temporarily labelled image data, which consists of the temporary label value and the run length value and which is output from the output ZOUT of the above-described fourth embodiment according to the present invention. That is, the temporary memory 74 serves as a buffer for temporarily lebelled image data.

The finally labelled image data generating circuit 70 is composed of the finally labelled image data generating means 76 and the run length inverter 64.

The finally labelled image data generating circuit 70 can output finally labelled image data in run length format as well as finally labelled image data which is data for blocks of one pixel.

Figure 17:
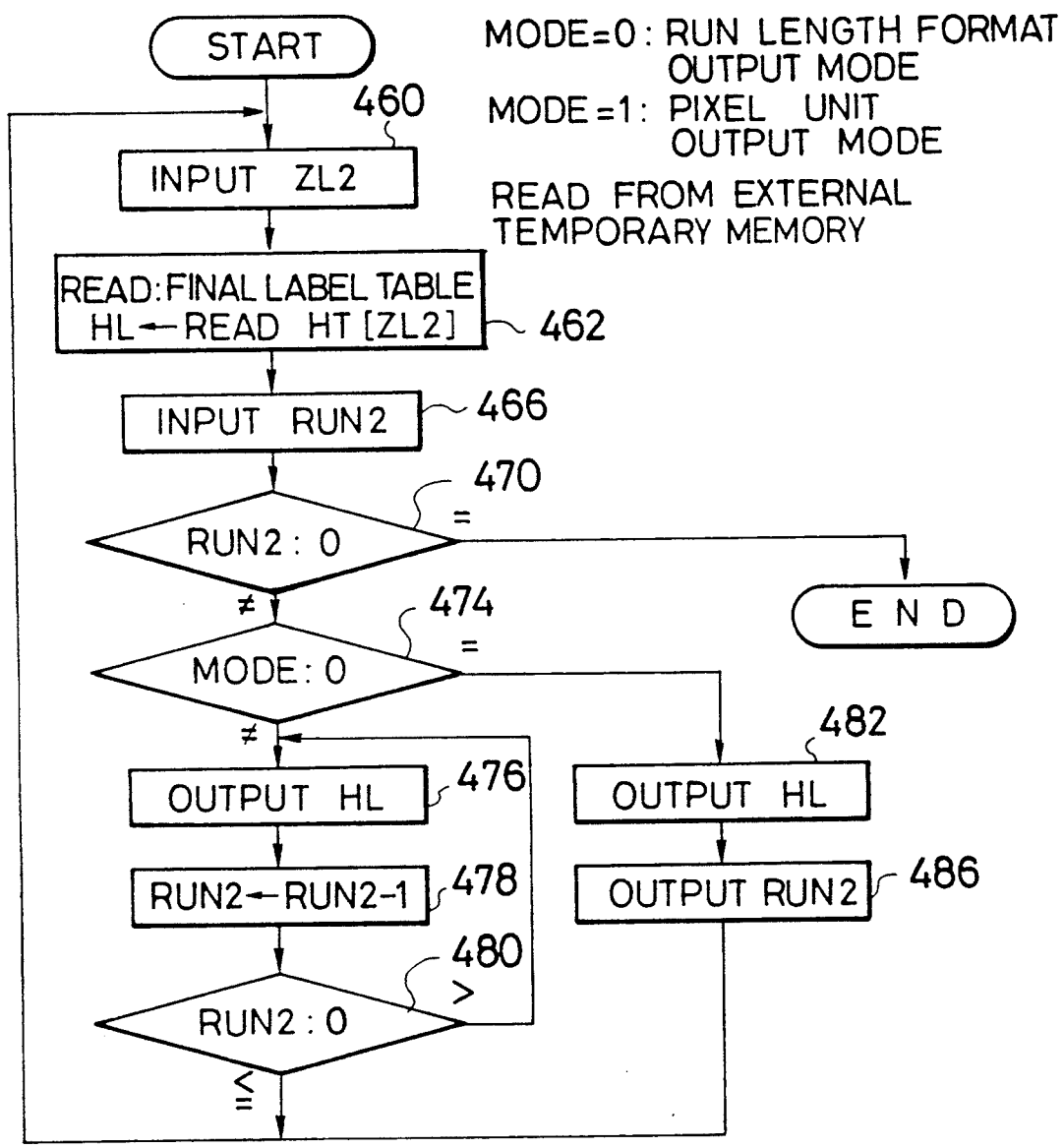
FIG. 17 is a flowchart showing the processing of the finally labelled image data generating circuit.

FIG. 17 is a flowchart illustrating the processing of the above-described finally labelled image data generating circuit.

If, the value of an output mode memory MODE is "0" in FIG. 17, then the run length format output mode becomes active, which means that the finally labelled image data generating circuit 70 outputs finally labelled image data in run length format, i.e. finally labelled image data consisting of the final label value and the run length value.

On the other hand, if the value of the output mode memory MODE is "1", then the output mode for blocks of one pixel becomes active, which means that finally labelled image data, which is the final label value for blocks of one pixel, is output.

In step 460 in the flowchart of FIG. 17, the temporary label memory ZL2 is read in from the temporary memory 74.

In step 462, the data of the final label table HT at the address whose value is equal to the value of the temporary label memory ZL2 is read and written into the final label value memory HL.

In step 466, the run length memory RUN2 is read in from the temporary memory 74.

In step 470, the value of the run length memory RUN2 is evaluated. If it is "0", the generation of the finally labelled image data for one scene is terminated and the processing illustrated in the flowchart of FIG. 17 terminates.

In step 474, the data format of the output of the finally labelled image data generating circuit is selected, according to whether the value of the output mode memory MODE is "0" or not.

If, the run length format output mode is active in step 474, then, by the output of the final value memory HL in step 482 and the output of the run length memory RUN2 in step 486, the finally labelled image data consisting of the final label value and the run length value is output.

On the other hand, if, the output mode for the output in blocks of one pixel is active in step 474, then the processing moves to steps 476 through 480.

In steps 476 through 480, the value of the data of the final label value memory is output N times, where N is equal to the value of the run length memory RUN2. The finally labelled image data, which is the final label value for each pixel, is output by means of this procedure.

According to the finally labelled image data generating circuit shown in FIGS. 16 and 17, it is thus possible to obtain finally labelled image data to which definitely determined label values, i.e. final labels value, are assigned.

What is claimed is:

1. An image processing labelling circuit for scanning two-valued pictures in one scene in a raster scan direction with a specified mask to determine a connection relationship between a current pixel and pixels surrounding said current pixel within said mask and sequentially determines and assigns a label value to each pixel, comprising:
   an initial label memory storing initial temporary label values of connected pixels within a current scan line; and
   a run length counter counting the number of connected pixels the current scan line being scanned; wherein
   said image processing labeling circuit uses said initial label memory and said run length counter to generate temporarily labelled image data and temporary label table data, said temporary label table data indicating conversion relationships for integration of the temporary labels, and to thereafter generate finally labelled image data from the temporarily labelled image data and the temporary label table data.

2. An image processing labelling circuit for scanning two-valued pictures in one scene in a raster scan direction with a specified mask to determine a connection relationship between a current pixel and pixels surrounding said current pixel within said mask, said circuit having at least two stages for sequentially determining a label value and assigning a temporary label to each pixel to obtain temporarily labelled image data prior to converting the temporary label of each image data into a final label in accordance with data of a final label table, comprising:
   a temporary label image data generating circuit generating temporarily labelled image data that may undergo a conversion for the modification of label values so that the label values are modified in decreasing label value order only, and generating temporary label table data that indicates conversion relationships for integration of the temporary labels;
   a temporary label table storing said temporary label table data at addresses corresponding to the temporary label values, the temporary label table data being conversion target temporary label values;
   a final label table storing the final label values at addresses corresponding to the temporary label values;
   a temporary label table data reading circuit sequentially reading the temporary label table data in increasing order of the addresses; and
   a final label table data writing circuit comparing said read temporary label table data with said read address value, and determining whether a conversion of the temporary label value corresponding to said read address is required,
   wherein if the final label table data writing circuit determines that a conversion is not required, a final label value is written as said final label value into the final label table at an address being equal to said read address, and if the final label table data writing circuit determines that a conversion is required, the data writing circuit reads data from the final label table at an address being equal to the value of said temporary label table data, which was read from the temporary label table, and writes said data into the final label table at an address being equal to the address from which the data writing circuit read the temporary label table.

3. The labelling circuit according to claim 2, wherein said final label table data writing circuit writes the data read from said temporary label table as a new final label value into the final label table, if it is evaluated that said conversion is not required.

4. The labelling circuit according to claim 2, wherein said final label table data writing circuit writes, during the conversion into the final label table, the value of the final label counter, which generates final labels of consecutive label values, into the final label table at an address being equal to the address at which said temporary label table was read, if it is evaluated that said conversion is not required.

5. The labelling circuit according to claim 4, wherein said final label counter is incremented each time a new final label is issued.

6. The labelling circuit according to claim 2, wherein said temporarily labelled image data generating circuit comprises:
- an initial label memory which stores the initial temporary label value of the pixels which are connected within the very one line being scanned, and
- a run length counter which counts the number of pixels which are connected within the very one line being scanned, whereby
- uses said initial label memory and run length counter to generate said temporarily labelled image data and temporary label table data.

7. The labelling circuit according to claim 6, wherein said temporarily labelled image data is composed of temporary label data and run length data, which is the data of the number of pixels in the connected pixel corresponding to said temporary label data.

8. The labelling circuit according to claim 6, wherein said temporarily labelled image data generating circuit determines the initial label value of the envisaged pixel by means of a mask with a specified number of pixels and, if the sequentially scanned envisaged pixels are connected pixels, counts the number of pixels of the connected pixels by means of said run length counter.

9. An image processing labelling processor, for scanning two-valued pictures in one scene in a raster scan direction with a specified mask to determine a connection relationship between a current pixel and pixels surrounding said current pixel within said mask, comprising at least two stages for sequentially determining a label value and assigning a temporary label to each pixel to obtain temporarily labelled image data prior to converting the temporary label of each image data into a final label in accordance with data of a final label table, said circuit comprising:
- a temporary label table data generating means, comprising an initial label memory storing the initial temporary label values of connected pixels within a current scan line, and a run length counter counting the number of connected pixels within the current scan line, said generating means using said initial label memory and said run length counter to generate temporarily labelled image data capable of undergoing a conversion for the modification of label values so that the label values are modified in decreasing label value order only, and generating temporary label table data indicating conversion relationships for modification of the temporary labels,
- a temporary label table, whose addresses are the temporary label values, for storing conversion target temporary label values as said temporary label table data,
- a final label table, whose addresses are the temporary label values, for storing final label values,
- a temporary label table data reading means for sequentially reading the temporary label table data, which is the conversion target temporary label value of said temporary label table, in an increasing order of the addresses, and
- a final label table data writing means for comparing said read data address value, evaluating whether a conversion of the temporary label value corresponding to said read address is required, determining a final label value, which is a new final label, and writing said final label value into the final label table at an address being equal to said read temporary label table address, when said writing means determines that a conversion is not required, and, when said writing means determines that a conversion is required, for reading data from the final label table at an address being equal to the value of said temporary label table data, which was read from the temporary label table, and writing said data into the final label table at an address being equal to the read temporary label table address.

10. The labelling processor according to claim 9, wherein the processing of said temporary label table data reading means and the processing of said final label table data writing means is partly performed simultaneously.

11. A labeling circuit for creating identification labels for identifying connected components of an image, the image comprising a plurality of scan lines, each scan line comprising a plurality of pixels, the circuit comprising:
- input means for receiving data signals indicative of the pixels of the image;
- mask means for storing pixel data signals representative of an image value of a plurality of adjacent pixels of a current scan line, the adjacent pixels comprising at least a current pixel and a previous pixel, and for storing a plurality of label signals representative of connectedness of pixels of a previous scan line which are adjacent to the current pixel;
- an initial label memory storing initial temporary label signals representative of the connectedness of pixels of the current scan line;
- a run length counter for counting a number of connected pixels of the current scan line;
- temporary label generating means for generating, for each pixel of the current scan line, a temporary label data signal representative of connectedness of said pixel and for generating, for each temporary label data signal, a conversion relationship data signal; and
- final label generating means for generating, for each temporary label signal, a final label signal based on the temporary label data signal and the conversion relationship data signal.

12. The labeling circuit of claim 11, wherein the temporary label generating means comprises:
- initial label generating means for generating initial label signals and for writing the initial label signals to the initial label memory;

read means for reading a plurality of initial label signals from the initial label memory to the mask means;

write means for writing at least updated initial label signals to the initial label memory; and conversion data signal generating means for generating conversion data signals.

13. the labeling circuit of claim 12, wherein the initial label generating means comprises:

first binary means for generating a first binary data signal based on contents of a first portion of the mask means, the first portion storing the plurality of label signals;

second binary means for generating a second binary data signal based on contents of a second portion of the mask means, the second portion storing the pixel data signals;

comparing means for initially comparing the contents of the first portion based on the first and second binary data signal;

labeling means for labeling at least one of the pixel data signal based on the first and second binary data signals and the comparison from the comparing means; and updating means for generating the updated initial label signals based on a comparison from the comparison means.

14. A labeling circuit for labeling binary images with identification labels for identifying connected components of the binary image, the binary image comprising a plurality of scan lines, each scan line comprising a plurality of pixels, the circuit comprising:

a temporary label data generating circuit;

a temporary label table generating circuit;

a final label table generating circuit; and a final label data generating circuit; wherein the final label table generating circuit generates final label table data for each label entry in a single iteration based on temporary label table data and temporary label table addresses.

* * * * *